(12) United States Patent
Lu et al.

(10) Patent No.: US 7,442,352 B2
(45) Date of Patent: Oct. 28, 2008

(54) FLUE GAS PURIFICATION PROCESS USING A SORBENT POLYMER COMPOSITE MATERIAL

(75) Inventors: Xiao-Chun Lu, Newark, DE (US); Xiaoqun Wu, Wilmington, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 329 days.

(21) Appl. No.: 10/872,288

(22) Filed: Jun. 19, 2004

(65) Prior Publication Data
US 2005/0019240 A1  Jan. 27, 2005

Related U.S. Application Data

(60) Provisional application No. 60/479,881, filed on Jun. 20, 2003.

(51) Int. Cl.
*B01D 53/60* (2006.01)
*B01D 53/64* (2006.01)
*C01B 17/69* (2006.01)
*C01B 21/40* (2006.01)

(52) U.S. Cl. ............... 423/210; 423/239.1; 423/244.01; 423/244.02; 423/244.03; 423/215.5; 423/393; 423/522

(58) Field of Classification Search ................ 423/210, 423/239.1, 244.01, 244.02, 244.03, 215.5, 423/393, 522
See application file for complete search history.

(56) References Cited

U.S. PATENT DOCUMENTS

| | | | |
|---|---|---|---|
| 3,486,852 A | 12/1969 | Tamura et al. | |
| 3,962,153 A | 6/1976 | Gore | |
| 4,096,227 A | 6/1978 | Gore | |
| 4,140,752 A | 2/1979 | Ratcliffe et al. | |
| 4,164,555 A | 8/1979 | Steiner | |
| 4,187,390 A | 2/1980 | Gore | |
| 4,454,100 A | 6/1984 | Faatz | |
| 5,316,737 A | 5/1994 | Skelley et al. | |
| 5,549,966 A | 8/1996 | Sassa | |
| 5,620,669 A | 4/1997 | Plinke et al. | |
| 5,667,611 A | 9/1997 | Sassa | |
| 5,977,241 A | 11/1999 | Koloski et al. | |
| 6,132,692 A | 10/2000 | Alix et al. | |

(Continued)

OTHER PUBLICATIONS

Goto, S. and Morita M., "Oxidation of Sulfur Dioxide on Water-Repellent Activated Carbon," Chem. eng. Comm., vol. 60, pp. 253-269 (1987).

(Continued)

*Primary Examiner*—Timothy C Vanoy
(74) *Attorney, Agent, or Firm*—Carol A. Lewis White

(57) ABSTRACT

Process for removing sulfur oxides, mercury vapor, and fine particulate matters from industrial flue gases that contain such pollutants. Pollutants are removed by modules, which contain microporous adsorbent (i.e., sorbent) material held within a polymer matrix. The composite material that contains the microporous absorbent material held within a polymer matrix removes sulfur oxides by converting them into high concentration sulfuric acids. SULFURIC acid produced inside the composite material is automatically expelled onto the external surfaces of the composite material and is drained into an acid reservoir together with the fine particulate mailers which are washed from the external surfaces of the composite material by the constant dripping of the sulfuric acid along the external surfaces of the composite material.

13 Claims, 17 Drawing Sheets

*Direction of Uniaxial Expansion*

U.S. PATENT DOCUMENTS

| | | |
|---|---|---|
| 6,197,269 B1 | 3/2001 | Jansen et al. |
| 6,331,351 B1 | 12/2001 | Walters et al. |
| 6,544,317 B2 | 4/2003 | Miller |
| 6,608,129 B1 | 8/2003 | Koloski et al. |
| 6,616,905 B1 | 9/2003 | Kawamura et al. |
| 6,843,830 B2 * | 1/2005 | Sherer .......................... 95/90 |

OTHER PUBLICATIONS

Kohl, Arthur and Nielsen, Richard, "Gas Purification," 5th Ed., Gulf Publishing Company, Houston, TX, pp. 634-641 and 1126-1127 (1997).

* cited by examiner

*Direction of Uniaxial Expansion*

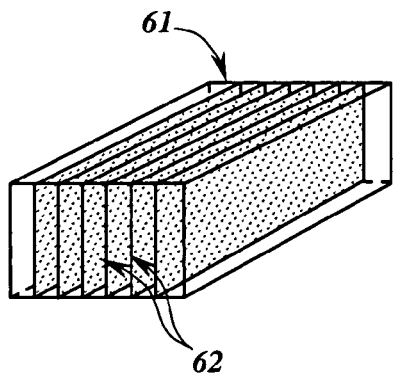
Figure 6
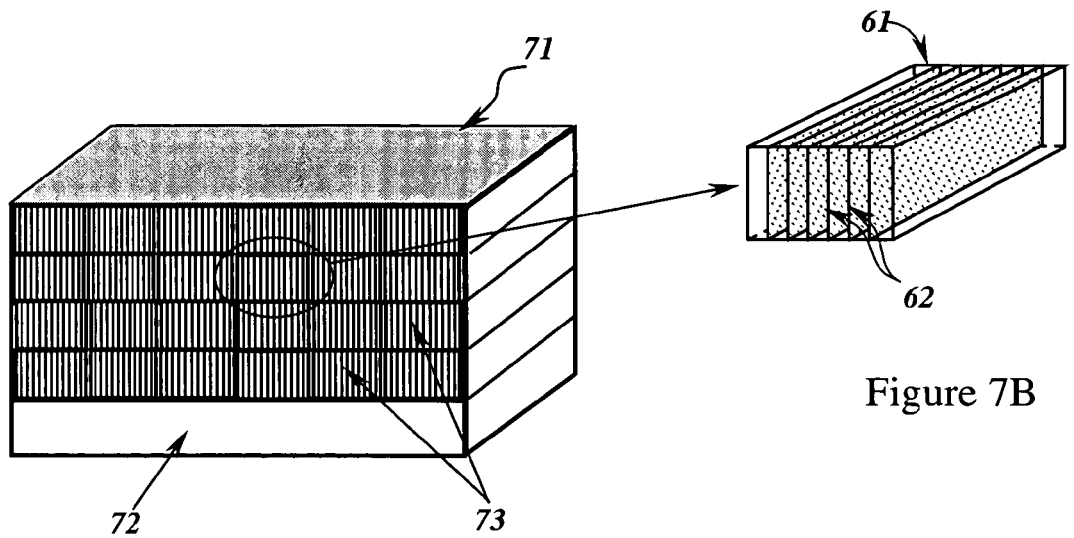
Figure 7A
Figure 7B
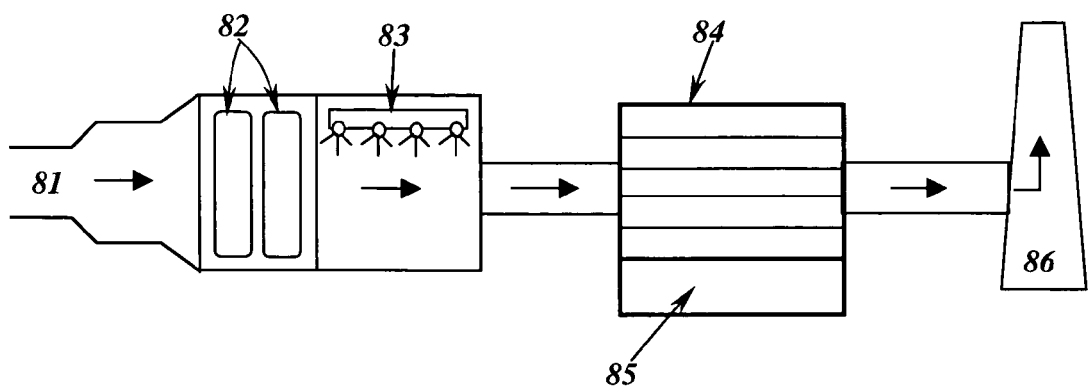
Figure 8

FLUE GAS PURIFICATION PROCESS USING A SORBENT POLYMER COMPOSITE MATERIAL

CROSS-REFERENCE TO RELATED APPLICATIONS

This application claims the benefit of U.S. provisional application 60/479,881 filed on Jun. 20, 2003.

STATEMENT REGARDING FEDERALLY SPONSORED RESEARCH OR DEVELOPMENT

This invention is partially supported financially by the U.S. National Science Foundation Small Business Innovation Research Program DMI-0232034 and the U.S. Environmental Protection Agency Small Business Innovation Research Programs 68-D-03-035 and EP-D-04-061. The U.S. government has certain rights in this invention.

REFERENCE TO A COMPACT DISK APPENDIX

Not applicable.

BACKGROUND OF THE INVENTION

1. Field of the Invention

The present invention relates to a pollution control method for removing sulfur oxides, mercury vapor, and fine particulate matters from industrial flue gases, such as coal-fired power plant flue gas.

2. Description of the Related Art

Coal-fired power generation plants, municipal waste incinerators, and oil refinery plants generate huge amounts of flue gases that contain substantial varieties and quantities of environmental pollutants, such as sulfur oxides ($SO_2$, and $SO_3$), nitrogen oxides (NO, $NO_2$), mercury (Hg) vapor, and particulate matters (PM). In the United States, burning coal alone generates about 27 million tons of $SO_2$ and 45 tons of Hg each year.

The destructive effects of various coal-burning pollutants on human health and on the ecosystem were recognized a long time ago. For example, SOx and NOx have been linked to the outbreak of respiratory diseases in the affected areas. They also form acid rains, which damage forests, fisheries, and architectures. As for Hg, it is a potent toxin to the nervous system. Exposure to mercury can affect the brain, spinal cord, and other vital organs. It is particularly dangerous to developing fetuses and young children. Relatively less attention is paid to the particulate matters (PM). However, fine particulates, especially those of less than 2.5-micrometer size (PM2.5), cause great health problems on human beings. PM2.5 is typically loaded with various toxic chemicals such as sulfates, nitrates, and heavy metals. PM2.5 is found to trigger heart attacks, damage lungs and kill thousands of people every year.

The typical methods of removing pollutants from industrial flue gases are designed to remove individual pollutants. For example, the prevailing technology for flue gas desulfurization (FGD), or $SO_2$ removal, is the limestone based wet scrubber or dry scrubber, which uses alkali limestone to neutralize and remove SOx. The prevailing technology for flue gas NOx removal is the selective catalytic reduction (SCR), which uses ammonia or urea to catalytically convert NOx into nitrogen, oxygen, and water. These technologies are typically very complicated and expensive.

In U.S. Pat. No. 6,132,692, a process for reducing multiple pollutants (particles, Hg, NOx, and $SO_2$) is disclosed. In this process, an electrical barrier discharge reactor produces the HgO and acids $HNO_3$ and $H_2SO_4$, a wet electrostatic precipitator (ESP) collects the HgO, acids, and particulates. The collected pollutants are then drained from the wet ESP for further processing. However, the $SO_2$ and NOx removal efficiencies of this process are limited, while the system is expensive, energy input is very high, and the collected acid solution may need treatment as liquid waste.

Activated carbon based flue gas purification technology is frequently studied and has enjoyed some commercial success. The technology can potentially remove both SOx and mercury vapor simultaneously. In U.S. Pat. No. 3,486,852, an adsorbing process and apparatus for the removal of $SO_2$ from industrial waste gases is disclosed. The adsorbing units consist of an adsorbing zone, two regenerating (or washing) zones and a drying zone. The washing liquid (water) from the washing zone can be neutralized with an alkaline compound in a neutralization tank or passed to an acid concentrator. In U.S. Pat. No. 4,164,555, a pollution control system, along with the method in which $SO_2$ in flue gases are adsorbed by activated char in a gas-solid contacting device, is disclosed. The saturated char is regenerated in an integrated desorption-reduction vessel; to which crushed coal and combustion-supporting air are supplied. The regeneration process generates $SO_2$ and $CO_2$ and consumes a portion of the char. The generated $SO_2$ can be fed into a sulfuric acid manufacturing plant.

All the activated carbon based flue gas purification technologies require a carbon regeneration process, because the activated carbon will be saturated by the adsorbed $SO_2$ or the converted $SO_3$ and/or $H_2SO_4$. The regeneration process requires either high temperature degassing or water washing. The disadvantages of a regenerating process are: 1) it consumes activated carbon; 2) it generates secondary pollution, such as low concentration acid solution; and 3) it makes the overall system complicated and expensive.

Therefore, there is a need to provide a simple system that can simultaneously remove multiple flue gas pollutants such as SOx, Hg vapor, and PM2.5 with low cost. It is desirable that the system is simple, does not generate secondary pollutions, and has the capability of producing a useful end product. More specifically, an activated carbon based system without a costly and complicated regeneration process is desirable.

BRIEF SUMMARY OF THE INVENTION

In accordance with the present invention, there is provided a process for removing multiple pollutants from industrial flue gases such as the flue gas from a coal-fired power generating plant. The flue gas is conveyed through a series of heat exchangers in the exhaust duct including direct water spray to cool the flue gas from an elevated temperature to less than 100° C. The cooled flue gas is then introduced into a sorbent-polymer-composite (SPC) sorbent house, where the pollutants such SOx, Hg vapor, and PM2.5 are removed. Thereafter, the flue gas is discharged into the stack substantially free of the pollutants.

Further in accordance with the present invention, there is provided an SPC sorbent house that removes $SO_2$ and $SO_3$ from flue gas without requiring a complicated regeneration process. The SOx from the flue gas are converted on the SPC material to $H_2SO_4$ and the converted $H_2SO_4$ is automatically expelled onto the SPC external surfaces, where the acid solution drips down to the acid reservoir and is collected as a product. The collected solution contains a high $H_2SO_4$ concentration (10-60%) and can be used or sold as industrial material with minimal processing.

In another aspect of the present invention, there is provided an SPC sorbent house that removes Hg vapor from flue gas by chemically adsorbing Hg vapors (either elemental mercury or oxidized mercury) into its matrix. The adsorbed Hg vapor is chemically fixed on the carbon internal surfaces without being able to leach out. The SPC sorbent house has such a high Hg fixation capacity that the SPC sorbent material can be used for flue gas purification for a long period of time continuously while maintaining a high Hg removal efficiency. With a careful design, the usable life of the SPC sorbent material for coal-fired flue gas Hg removal can be more than 10 years.

Additionally, in accordance with the present invention, there is provided an SPC sorbent house that removes fine particulate matters (PM2.5) from flue gas by surface filtration on the SPC external surfaces with or without one or more externally laminated porous PTFE (polytetrafluoroethylene) membranes. The trapped particles will be removed from the SPC surfaces by the dripping $H_2SO_4$ solution (i.e., the solution that is generated when the $SO_x$ from the flue gas is converted on the SPC material to $H_2SO_4$ which is then expelled from the interior of the SPC material to the external surfaces of the SPC material, there forming droplets which join together and drip downwards onto the lower sections of the SPC material).

Accordingly, a principal objective of the present invention is to provide a sorbent-based method and apparatus for removing multiple pollutants, such as SOx, Hg vapor, and PM2.5, from industrial flue gases to a level required by the air quality standards, while reducing the cost of removing the pollutants by eliminating the costly sorbent regeneration process and producing the salable sulfuric acid solution.

Another object of the present invention is to provide a method and apparatus for converting SOx in the industrial flue gases into sulfuric acid and expelling and collecting the sulfuric acid for sales. The sorbent material and the apparatus are so designed that no separate sorbent regeneration is required, neither by high temperature degassing nor water washing, and the collected solution has a high sulfuric acid concentration (10-60% by weight).

Another object of the present invention is to provide a method and apparatus for removing Hg vapor from industrial flue gases by chemically fixing the Hg vapor onto the sorbent matrix.

A further object of the present invention is to provide a method and apparatus for removing PM2.5 from industrial flue gases by surface filtration using the porous PTFE membranes. The trapped particles will be washed away from the membrane surfaces by the dripping sulfuric acid solution; therefore, no separate dust cake removal is required.

These and other objects of the present invention will be more completely disclosed and described in the following specification, accompanying drawings, and appended claims.

BRIEF DESCRIPTION OF THE DRAWINGS

The operation of the present invention should become apparent from the following description when considered in conjunction with the accompany drawings, in which:

FIG. 6 is a schematic illustration of a sorbent module used in the present invention.

FIG. 7A is a schematic illustration of a sorbent house used in the present invention.

FIG. 7B is a magnified view of one of the modules contained in the sorbent house of FIG. 7A.

FIG. 8 is a schematic illustration of the flue gas cleaning process described in the present invention.

DETAILED DESCRIPTION OF THE INVENTION

Figure 1:
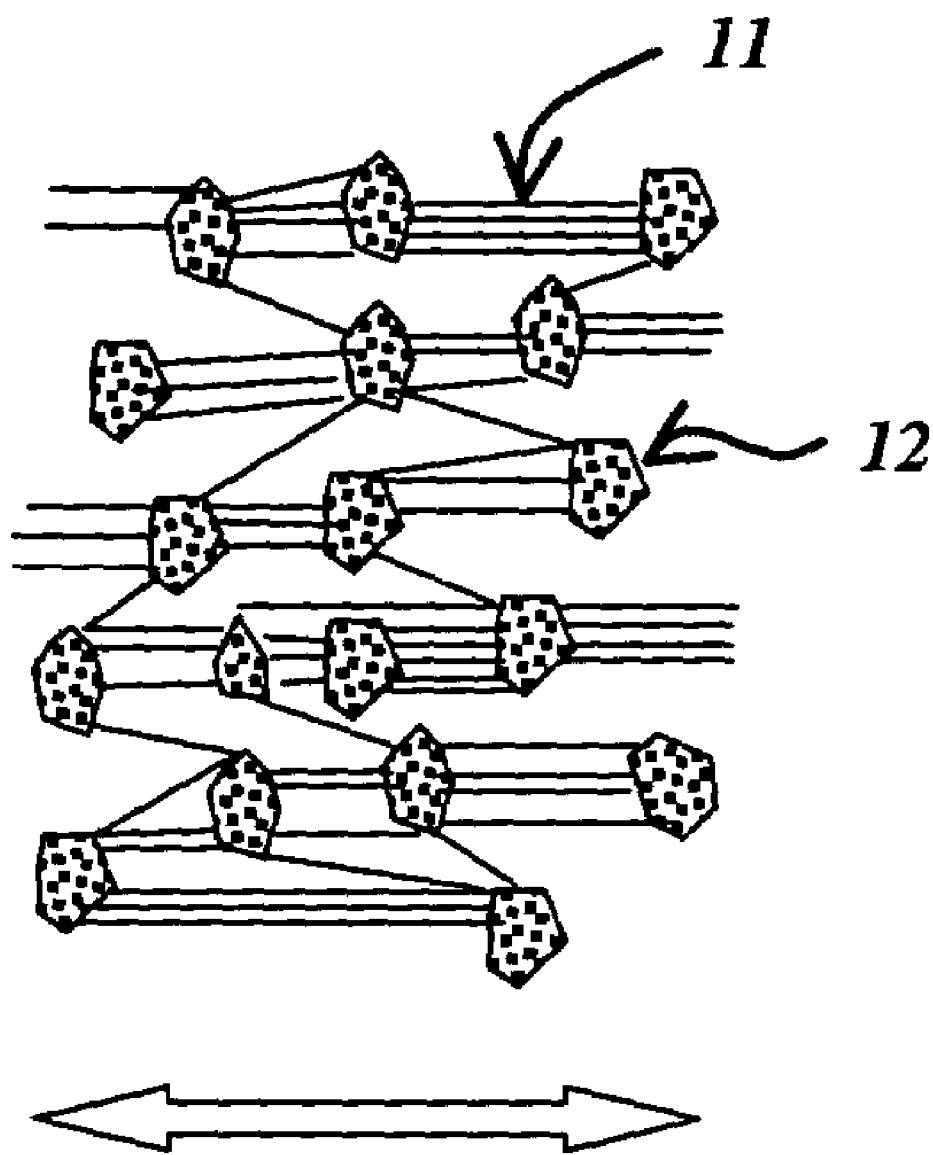
FIG. 1 is a schematic illustration of the microscopic structure of a sorbent-polymer-composite (SPC) material employed in the present invention. The solid nodes represent the sorbent particles, and the lines represent the polymer fibrils.

The present invention includes a process that removes sulfur oxides, mercury vapor, and fine particulate matters from an industrial flue gas using a sorbent-polymer-composite (SPC) material. The invention also includes the SPC material itself. The process converts sulfur oxides into sulfuric acid, and the acid is collected as a concentrated solution which can be used or sold as a product. The process also fixes mercury vapor into the SPC matrix by chemical adsorption. Still further, the process removes fine particles (PM2.5) via surface filtration by the SPC material or by a porous polytetrafluoroethylene (PTFE) membrane that is laminated on one or more surfaces of the SPC material.

SOx Removal

It has been proven that adsorption on sorbent materials, especially on the activated carbons, is one of the viable approaches to remove SOx from flue gas. In the adsorbent-based process, the flue gas is forced to flow through an adsorbent bed, and the SOx molecules are adsorbed on the adsorbent surface. When adsorbed, $SO_2$ is catalytically converted into $SO_3$, and it is further converted into sulfuric acid ($H_2SO_4$) together with water vapor from the flue gases. The converted acid stays on the adsorbent pore surfaces. The overall reaction is as follows:

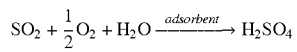

$$SO_2 + \frac{1}{2}O_2 + H_2O \xrightarrow{adsorbent} H_2SO_4$$

Here the oxygen ($O_2$) and water vapor ($H_2O$) are from flue gases, and the adsorbent also serves as a catalyst.

It seems that the adsorbent process is simple and effective. However, the problem arises from the adsorbent regeneration. When adsorbent surfaces (catalytic sites) are covered by sulfuric acid, the adsorbent gradually loses its catalytic activity. Therefore, periodic adsorbent regeneration is required. The two most used regeneration methods are high temperature degassing and water washing. However, both regeneration methods are complex, energy intensive, and generate secondary pollution. For example, water washing generates huge amounts of sulfuric acid solution with very low acid concentration (7% or lower). Such acid solution is difficult to store, ship, or market. It may require on-site treatment as wastewater.

It is our discovery that when adsorbents are made into SPC, the material will never be saturated by the converted sulfuric acid. Specifically, the converted sulfuric acid, in its relatively concentrated solution form, will be expelled from the SPC matrix onto the external surfaces of the SPC material, and can be collected easily as a product. We refer to the acid solution expelling phenomenon as the "reverse sponge" since it is just opposite to a sponge which tends to absorb solution into its matrix whenever it is contacted with a solution.

In the following description, we explain the reverse sponge phenomenon and its application for SOx removal using $SO_2$ and an activated carbon-fluoropolymer composite (CPC) material as an example.

In this embodiment of the present invention, the sorbent in the SPC material is activated carbon and the polymer is a fluoropolymer (e.g., polytetrafluoroethylene, PTFE). PTFE, such as one produced by the Dupont Company, known as Teflon®, is a chemically inert material. By incorporating the activated carbon into the PTFE, the activated carbon not only retains its physical and chemical properties, but it also gains advantages in cleanliness, chemical inertness and water repellency. In addition, when the activated carbon is incorporated in the polymer, it is much easier to handle.

Figure 2:
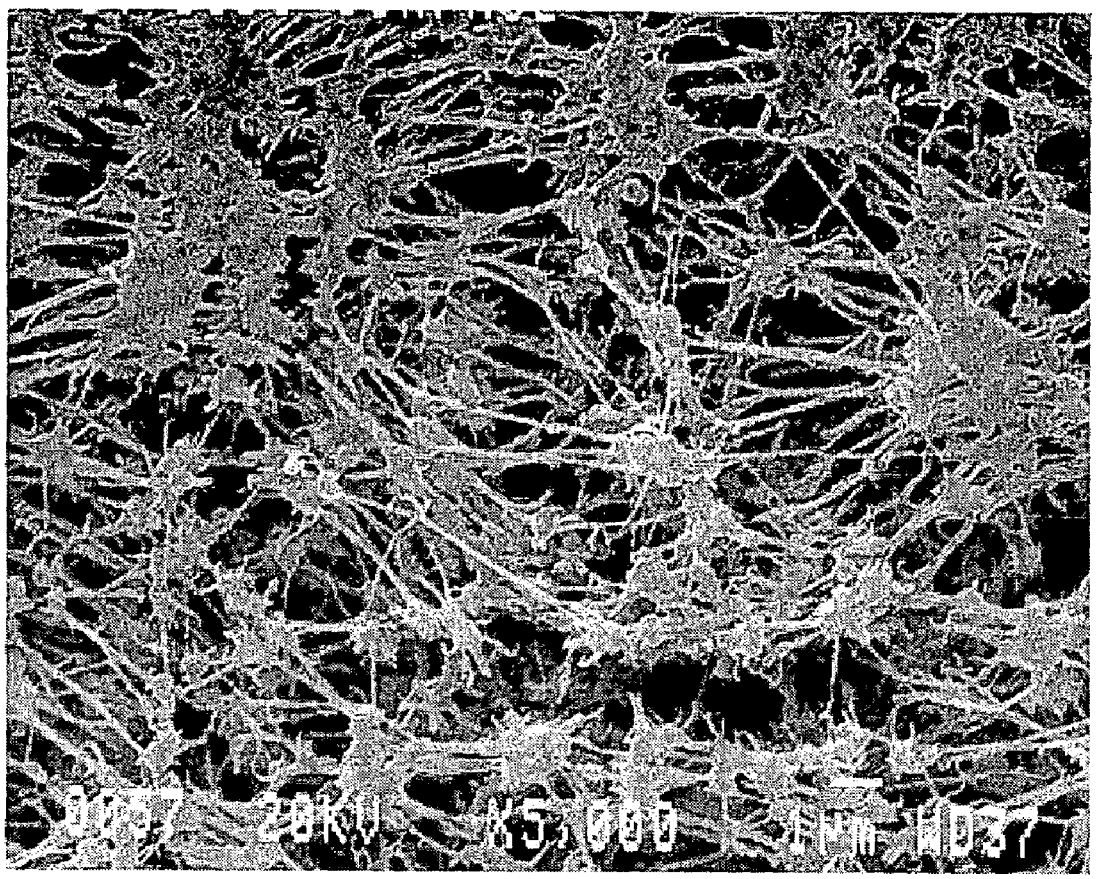
FIG. 2 is a scanning electron micrograph (SEM) of an SPC material employed in the present invention, enlarged 5,000 times.

Besides the chemical inertness, the structure of the fluoropolymer is also very unique. When made into sheet or tape form, fluoropolymer can be stretched up to hundreds of times its original size under high temperatures. After such stretching, the fluoropolymer becomes porous, with micropores formed by polymer nodes and fibrils. When activated carbon (or other adsorbents) are mixed with the fluoropolymer, the resulting mixture can also be expanded to form a porous structure. In this case, the polymer nodes are at least partially replaced by the fine carbon particles, as shown in FIG. 1, where the activated carbon particles 12 and PTFE fibrils 11 form a microporous structure. A microscopic picture, as shown in FIG. 2, reveals the microporous structure of the carbon-polymer composite (CPC) material.

Figure 3:
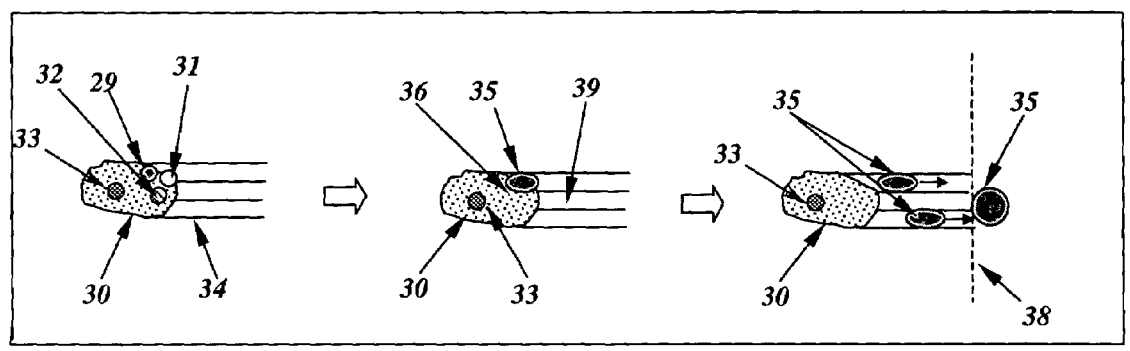
FIG. 3 is a schematic illustration of the $SO_2$/Hg removal processes using the SPC material of the present invention.
Figure 9:
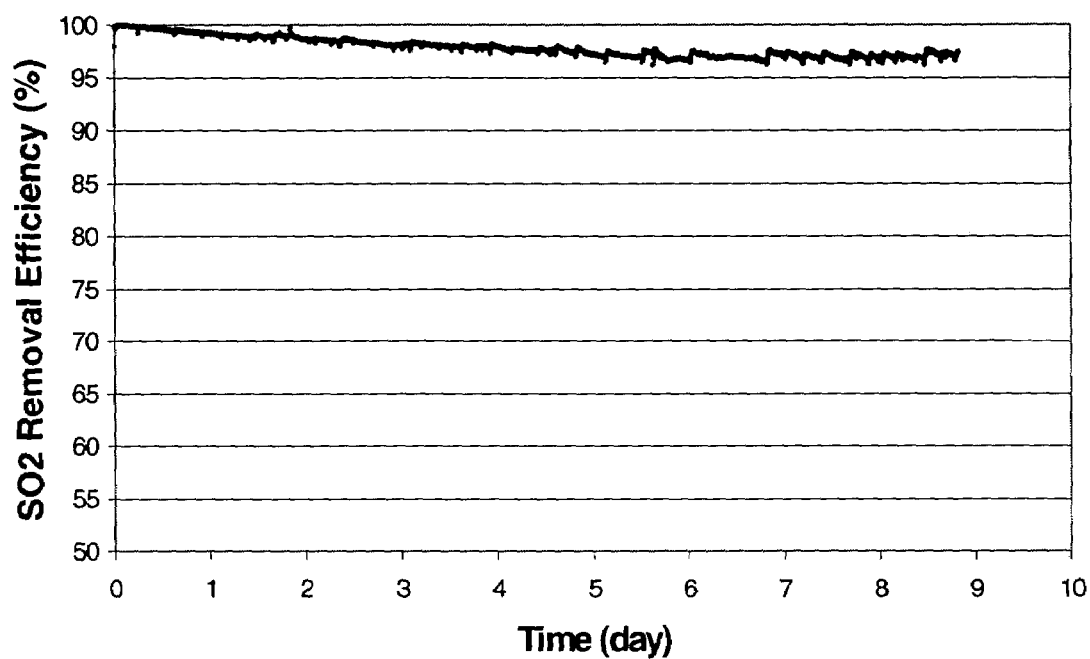
FIG. 9 is a plot of $SO_2$ removal test results using SPC material for 9 days.

Since the CPC material is microporous (or micro capillary), and since PTFE has a high aqueous liquid expelling capability (water repellency), aqueous liquid cannot exist inside the microporous matrix. The capillary flow will force the liquid out of the matrix to the external surfaces of the CPC material. This is opposite to sponge material, which absorbs aqueous liquid when contacted with the liquid. Using $SO_2$ as an example, as shown in FIG. 3, when flue gas is introduced into CPC material 34, $SO_2$ molecules 31 are adsorbed on a carbon particle 30 together with oxygen 32 and water 29 molecules. The adsorbed molecules are converted into $H_2SO_4$ 35 on the carbon pore surfaces 36. The mercury molecules 33 are chemically adsorbed on the carbon particles 30. The converted acid 35, either by itself or mixed or dissolved in the water that is also present on the carbon particles, will penetrate into the PTFE polymer fibril networks 39 that are attached to the carbon particles. These fibril networks form numerous small channels like capillaries. PTFE polymer has an extremely low surface energy (fluoropolymer has the lowest surface energy among the man-made materials), which is non-wetting for most inorganic liquids. When the acid (or acid and water) penetrates into these "capillaries" it is not stable, and will be expelled to the CPC external surfaces 38 due to the capillary flow. Therefore, the converted acid is continuously drawn away from the carbon particles, hence keeping the activated carbon from saturation by the acids. FIG. 9 shows the test results of $SO_2$ removal from a simulated flue gas using a CPC material. In this test, 150 sccm (standard cubic centimeter) flue gas with 900 ppmv (parts per million by volume) $SO_2$, 6% by volume $CO_2$, and 65% relative humidity was used. The test was conducted at 67° C. 0.9 grams of CPC material in sheet form with about 42 cm² external surface area treated was attached on two walls of a rectangular adsorbent bed. Simulated flue gas flowed by the CPC material so that there was virtually no pressure drop across the adsorbent bed. As shown in FIG. 9, after about 3 days, the removal efficiency is stabilized at about 97% (i.e., an $SO_2$ breakthrough value of 3%). Even though no regeneration steps were performed during the duration of the experiment, the CPC material kept almost the same $SO_2$ removal efficiency for up to 9 days as shown in FIG. 9.

Figure 10:
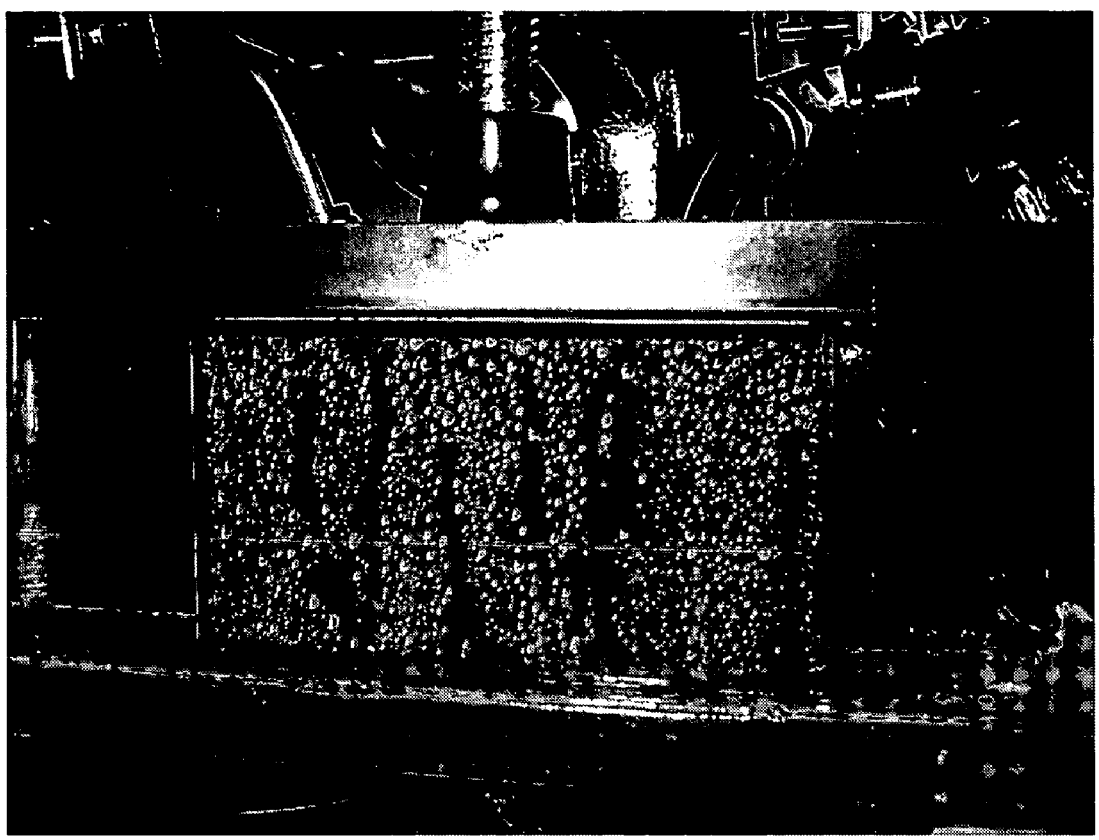
FIG. 10 is a picture of SPC material during the course of an $SO_2$ removal test, the droplets are the sulfuric acid solution, and the vertical lines are the trajectories of dripping sulfuric acid droplets.

The sulfuric acid (or solution of sulfuric acid in water) that is generated in the activated carbon particles is expelled onto the external surfaces of the CPC material and coalesces into droplets. When those droplets become large enough, they fall downwards along the external surface of the CPC material, dragging other droplets down with them and thereby creating some refreshed surfaces where new droplets can form. This droplet forming and dropping phenomenon is shown in FIG. 10, which is a picture of the CPC material taken during the aforementioned $SO_2$ removal test. It shows the acid droplets and the droplet falling trajectories. The analyses of the collected solution show that the sulfuric acid concentration of the aqueous solution varies from 10-60% by weight depending on the test conditions. More typically, the solution collected from the $SO_2$ removal test is an aqueous solution which contains 35-45% by weight of sulfuric acid.

Mercury Vapor Removal

Before the present invention, injection of activated carbon powder into the flue gas was the most viable technology for flue gas mercury vapor removal. In the activated carbon powder injection process, after mercury vapor adsorption, the injected carbon powder is removed by electrostatic precipitator (ESP) or filter bag together with the fly ash. This process creates a source of secondary pollution because the collected fly ash is now contaminated with the mercury that is contained in the activated carbon particles. Further, fly ash that is collected from this process has limited uses due to its contamination with mercury and will be difficult to dispose of.

Besides the secondary pollution problems, carbon injection is not an efficient process to remove mercury vapors. In carbon injection, mercury vapor is removed via physical adsorption, that is, mercury molecules are trapped on the carbon surface via weak Van der Waals force. The overall Hg vapor adsorption capacity is very low due to the low Hg vapor concentration (<1 ppbv, parts per billion by volume) and relatively high adsorption temperature (150-300° C.), which are not favorable for the physical adsorption process. Hence, a very high weight ratio (over 20,000:1) of carbon to mercury is required that makes the process very costly.

It is known that a chemically modified activated carbon can chemically adsorb mercury vapor. For example, by modifying activated carbon with sulfur, sulfur compounds, or other chemical compounds, mercury vapor reacts with the chemical compounds on the carbon surfaces and is removed in the form of mercury compounds, e.g., HgS. In the chemical sorption process, the sorption capacity is insensitive to the mercury concentration, and the chemical sorption capacity can be several orders of magnitude higher than that of physical sorption. Furthermore, the spent carbon from the chemical sorption process contains sulfur compounds, such as inert and solid HgS, which makes the spent carbon much less toxic than the spent carbon from the carbon injection process, which contains elemental mercury.

However, it is difficult to use a chemically treated carbon for mercury removal from flue gases by traditional methods. First, if the treated carbon is injected in upstream of the ESP or filter bag house, the temperature (150-300° C.) is too high for chemical sorption to happen effectively. The chemical sorption process happens predominantly at low temperatures (100° C. or lower) and humid conditions. Second, if the treated carbon is used in a packed bed downstream of the ESP or filter bag house with reduced temperature and increased humidity, the carbon bed will also adsorb and convert sulfur oxides and other acid-forming gases and the resulting acids will saturate the carbon sorbent as discussed before unless the carbon sorbent is regenerated (using heat or washing with water) to remove the acid or acids that has or have built up in the carbon particles. With a regeneration process, the chemical nature of a treated carbon will be altered (i.e., the chemical compounds disposed in or on the carbon particles can be altered or removed, which will reduce the ability of the treated carbon to absorb and convert the mercury vapor). Furthermore, during the regeneration process, the previously adsorbed mercury may escape, either to the vapor phase or to the water, which causes secondary pollution.

The CPC system of the current invention avoids the above-mentioned difficulties. First, this system operates under moderate temperatures (e.g., 30-100° C.) and moderate relative humidity (e.g., 15-85%), which is ideal for a chemical adsorption process of mercury vapor by a treated activated carbon, and very high mercury removal capacity and efficiency can be achieved. Second, since no regeneration step is required (neither high temperature desorbing nor water washing), a chemically treated carbon will retain its chemical properties throughout the process.

Figure 11:
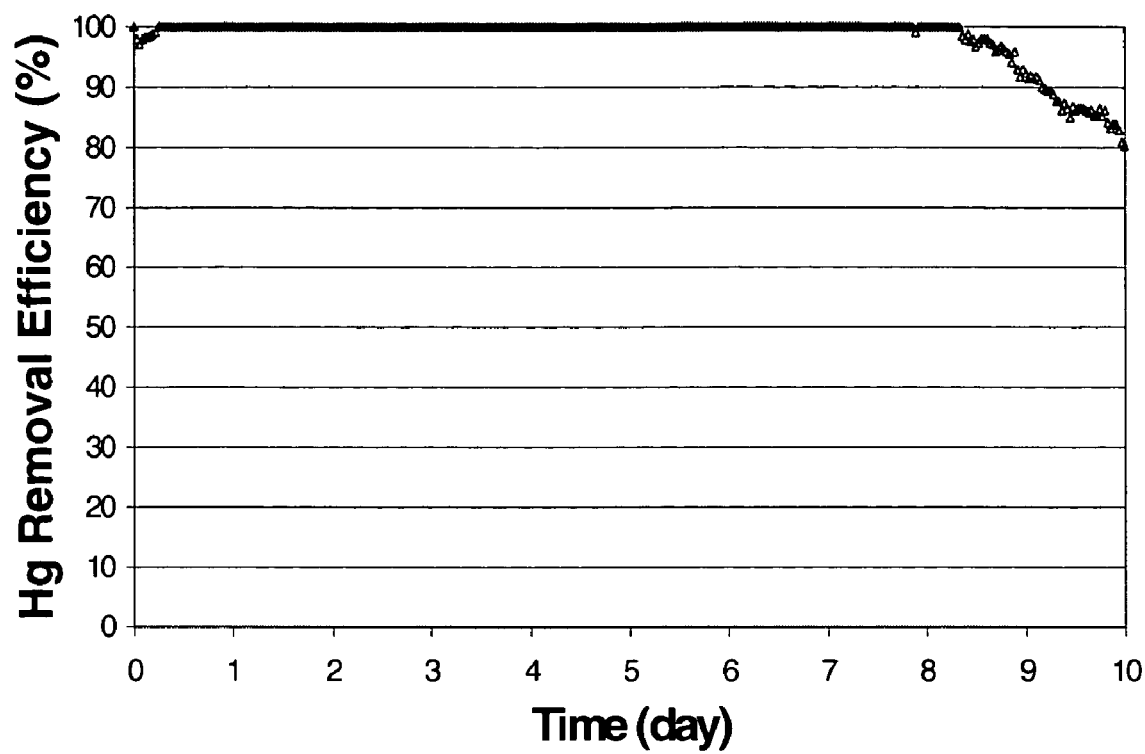
FIG. 11 is a plot of mercury removal test results using SPC material with simulated flue gas.

FIG. 11 shows the test results of elemental mercury removal from a simulated flue gas using a CPC material. In this test, 150 sccm simulated flue gas containing 5.23 mg/m$^3$ elemental mercury vapor and 2200 ppm $SO_2$, and at 50% relative humidity, pass-by a sample chamber packed with two pieces of CPC tape. The CPC material was treated with 2 wt % elemental sulfur and 0.2 wt % KI. Each piece of tape measured 4 cm×7 cm, weighed 0.45 gram and had an exposed external surface area of 28 cm (i.e., one 4 cm×7 cm face of the tape). As shown in the figure, very high (almost 100%) Hg removal efficiency was achieved for the first 8 days. Calculations showed that the CPC material had adsorbed, at the time when the Hg removal is at 90% efficiency (or after about 9 days), about 1.2 wt % elemental mercury, which is significantly larger than that of a physical adsorption process.

PM2.5 Removal

Coal-fired power generation plants are usually equipped with an electrostatic precipitator (ESP) or a filter bag house for fly ash removal. However, those devices are not effective for removal of fine particles, especially particles smaller than 2.5 microns (PM2.5). These small particles are usually loaded with toxic chemicals such as sulfates, nitrates, and heavy metals that pose great danger to human health.

Porous PTFE membrane is an excellent fine particulate matter filtration material. The principle of PTFE membrane filtration is based on surface filtration, i.e., the fine particles are captured on the membrane surfaces, instead of in the filter matrix as in other fabric filters. The porous PTFE membranes also have excellent dust cake release properties due to the low surface energy of the PTFE material and also due to the fact that the fine particles are collected on the membrane surfaces only. A simple liquid washing (such as liquid acid dripping), mechanical shaking, or an air pulsejet blowing may effectively release the filtered particles from the membrane surfaces. Since SPC material intrinsically has porous PTFE structure on its outer surfaces, it has PM2.5 filtration capability. To enhance the filtration capability, the outer surface of the SPC material can also be laminated with an extra porous PTFE membrane.

Figure 4:
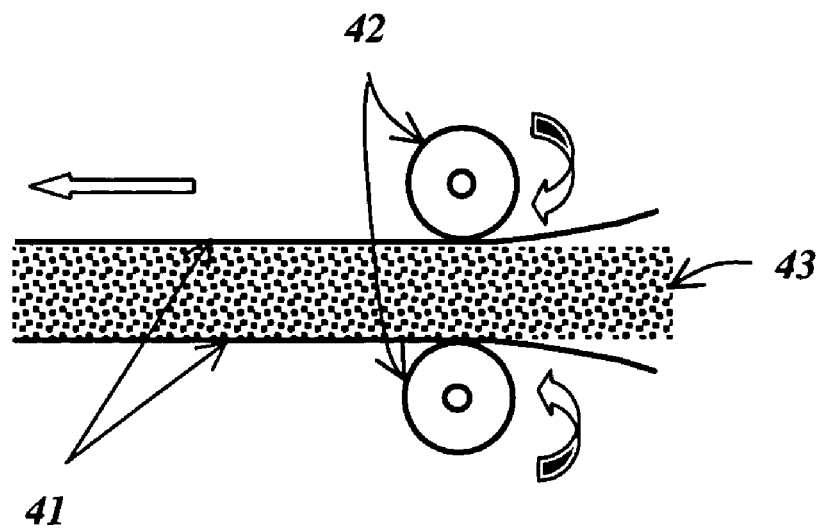
FIG. 4 is a schematic illustration of an SPC material laminated on both sides with porous fluoropolymer membranes.
Figure 5:
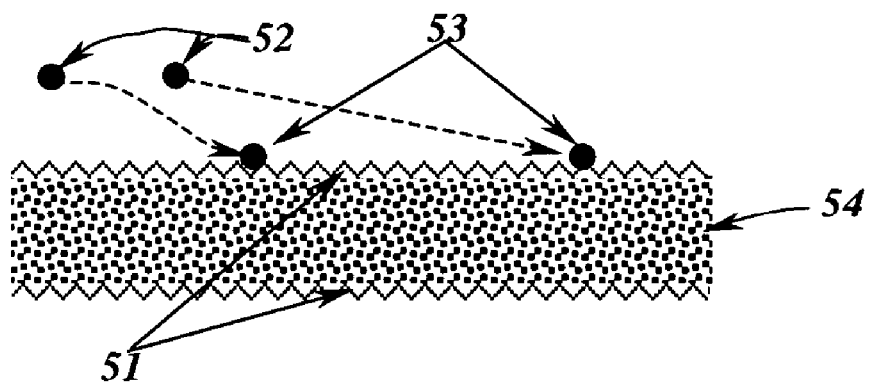
FIG. 5 is a schematic illustration of the PM2.5 removal process using the laminated SPC material of the present invention.

As illustrated in FIG. 4, porous PTFE membranes 41 are laminated on both sides of the CPC material (sheet) 43 so that both CPC sides have PM2.5 removal function. In one embodiment of the present invention, during the flue gas purification process, flue gas flows parallel to the CPC sheets. As shown in FIG. 5, due to diffusion and impaction, the fine particles 52 will collide with the membrane surfaces 51 and be trapped on it 53. This filtration process is more like "cross-flow" filtration, which is not as effective as "dead-end" filtration. However, due to the extremely large CPC surface area used for the present invention, we do not believe that the lower effectiveness of cross-flow filtration will prevent the CPC material from effectively filtering PM2.5 from the flue gas.

The trapped fine particles are removed from the CPC surfaces by the dripping $H_2SO4$ solution. Since for a typical coal-fired power plant flue gas, the weight ratio of $H_2SO_4$ solution (assume 50% concentration) to PM2.5 is very high, around 500-1000, there is enough sulfuric acid solution created by the CPC material during the removal of $SO_x$ from the flue gas to wash away the PM2.5 from the membrane surfaces. Therefore, no extra dust cake releasing process is required. This will greatly simplify the whole flue gas purification process.

SPC Material Preparation

The methods of preparing sorbent-polymer-composite (SPC) materials, or sorbent filled fluoropolymer materials, has been disclosed since 1975 (e.g., U.S. Pat. Nos. 4,096,227 and 3,962,153). The teachings of these patents are expressly incorporated herein by reference.

The preferred SPC material of the present invention is the activated carbon-polytetrafluoroethylene (PTFE)-composite, and is made in the following way. Activated carbon powder is blended with PTFE powder suspended in an emulsion. The weight percentage of activated carbon to the carbon-PTFE mixture is in the range of 90~20 wt %, and preferably in the range of 80~60 wt %. The blended powders are dried and lubricated with a mineral oil or water/alcohol mixture to form dough. The dough is extruded using a conventional extruder to form an extrudate. The lubricant is then removed from the extrudate by drying and the dried extrudate is then calendered into a CPC sheet form under elevated temperature. The CPC sheet is then stretched at high temperature to develop the microporous structure. When the SPC (here CPC) material of the present invention is stretched, the stretching ratio can be from 0.1 to more than 500%. Usually, the stretching ratio will be from 0.1 to 500%, 1 to 500%, 5 to 500% or 10 to 500%. Further, although it is possible to stretch the SPC material in more than one direction (i.e., laterally and longitudinally), it is usually more convenient to stretch the SPC material in one direction (here longitudinally). In one embodiment of the present invention, the sheet shaped product is further laminated with porous PTFE membranes on one or both sides or faces to form the laminated CPC sheet.

In another embodiment of the present invention, the calendered CPC sheet is not stretched before being used as the CPC material.

Besides polytetrafluoroethylene (PTFE), other fluoropolymer materials suitable for the current invention include, but are not limited to: polyfluoroethylene propylene (PFEP); polyperfluoroacrylate (PPFA); polyvinyl-lidene fluoride (PVDF); a terpolymer of tetrafluoroethylene, hexafluoropropylene and vinylidene fluoride (THV); and polychloro trifluoro ethylene (PCFE); and other copolymers or terpolymers of fluoromonomer/non-fluorinated monomers.

The $SO_x$ or mercury removal efficiency of the SPC material of the present invention can be enhanced by chemical treatment. To enhance the $SO_x$ removal efficiency, the sorbent material can be treated with a variety of chemicals known to promote the sorbent's $SO_x$ oxidation efficiency. Examples of suitable chemicals for sorbent treatment include, but are not limited to: alkaline metal iodides (e.g., potassium iodide, sodium iodide, rubidium iodide, and magnesium iodide, etc.) or organic iodide compounds (e.g., IR-780 iodide, etc.); vanadium oxides; metal sulfates (e.g., copper sulfate, iron sulfate, and nickel sulfate); iodide coordination complexes (e.g., potassium hexaiodoplatinate, etc.); or any combination of these chemicals. To enhance the mercury removal efficiency, the sorbent material can be treated with a variety of chemicals known to promote the sorbent's mercury chemical adsorption efficiency and capacity. Examples of suitable chemicals for sorbent treatment include, but are not limited to: elemental sulfur; sulfuric acid, metal sulfates (e.g., copper sulfate, iron sulfate, and nickel sulfate); oxides of iodine; chlorides, bromides and iodides of potassium, sodium, or ammonium; zinc acetate or any combination of these chemicals.

The chemical treatment of the sorbent material can be performed before or after the SPC material is made. In a preferred embodiment of the present invention, the chemical treatment of the sorbent material is performed before the SPC material is made. To treat the raw sorbent materials, conventional methods such as liquid impregnation, dry mixing, and/or high temperature dispersion can be used. After the sorbent material is combined with the polymer to produce the SPC material, a vacuum imbibing method can be used for chemical treatment (i.e., to chemically treat the sorbent material within the SPC material).

System Description

A preferred system arrangement of the present invention is shown in FIG. 8. The flue gas 81 from a combustor is reduced in temperature by heat exchangers and is then introduced into an electrostatic precipitator (ESP) or bag house 82. After the ESP or bag house, the flue gas is further reduced in temperature by water spray 83. The water spray will increase the flue gas humidity as well. After the water spray step, the flue gas is introduced into the SPC sorbent house 84, where $SO_2$ and $SO_3$ are converted into sulfuric acid solution and expelled onto the SPC external surfaces; the mercury vapor is chemically adsorbed on the sorbent material; and the fine particles are trapped either on the surface of the SPC material or on the surface of porous PTFE membranes that are laminated on the surfaces or faces of the sheets of SPC material. The expelled sulfuric acid will drip down to the acid reservoir 85 together with trapped fine particles (including the PM2.5). Finally, the cleaned flue gas exits from the sorbent house to the stack 86.

A preferred arrangement for the sorbent house 84 is shown in FIGS. 7A and 7B. The sorbent house is stacked with sorbent modules 73 in parallel (i.e., the SPC sheets in each module are parallel to one another and parallel to the SPC sheets in the other modules of the sorbent house). Each sorbent module 73 has a preferred arrangement as shown in FIG. 6 where SPC sheets 62 are fixed on a solid frame 61 in parallel with the same distance between the SPC sheets (i.e., the distance between neighboring SPC sheets in a module is the same). With this arrangement, flue gas entering into the sorbent house can be distributed uniformly around the SPC modules and sheets as the flue gas passes through the sorbent house. The design of the sorbent house ensures that the sorbent modules can be replaced easily, when needed. Also, the dripping sulfuric acid solution can be drained to the acid reservoir easily. The sulfuric acid solution can be withdrawn from the reservoir continuously. The solid frame 61 can be made of any engineering material that is compatible with the diluted sulfuric acid solution.

It should be appreciated that there are other possible arrangements of the sorbent house, like those used in the traditional adsorption and catalysis processes. One such arrangement is the sorbent "bag house", in which the SPC material is made into filter bags and is arranged in the same way as a conventional filter bag house. In this case, flue gas passes through the sorbent bags, and SOx, mercury vapor, and PM2.5 are removed. The difference between this arrangement and the sorbent house is the higher pressure drop for the sorbent bag arrangement. On the other hand, the pollutant removal efficiency of the sorbent bag arrangement will be better than the sorbent house arrangement.

Another possible arrangement of the SPC material is a conventional packed-bed system. In this arrangement, the SPC material is made into granular, rod, or other shapes. The shaped SPC material is then packed into various shaped containers to form packed sorbent beds. The operation using these beds is similar to those of a trickle bed, except that no external liquid is introduced into the bed in the present SPC arrangement. The beds are so designed that the sulfuric acid solution that is generated by the SPC material can be withdrawn from the beds easily. The packed beds can be connected horizontally, vertically, or both.

Besides the sorbent arrangements discussed above, many other SPC sorbent arrangements are also possible, as a person skilled in the art would understand.

$SO_x$ gases, such as sulfur dioxide and sulfur trioxide, mercury vapor, and fine particles are removed from flue gases with the present invention. It is also possible that nitric oxides (NOx) can be removed with the present invention when an ozone generator is integrated into the system.

NOx Removal

Ozone, which is oxygen in chemically active form (i.e., $O_3$), is a powerful oxidant, which can oxidize many chemical species at ambient conditions. At room temperature, the primary interaction between ozone and $NO_x$ is written as follows:

$$NO_x + O_3 \rightarrow NO_{(x+1)} + O_2$$

The conversion of NO to $NO_2$ by reaction with ozone is a fast reaction (<0.1 sec) taking place in gas phase. Some secondary reactions can also take place in gas phase:

$$2NO + 3O_3 \rightarrow N_2O_5 + 3O_2$$

$$NO_2 + O_3 \rightarrow NO_3 + O_2$$

The formed nitrogen oxides from the above reactions can easily react with water to form nitric acids, $HNO_3$. For example, $$N_2O_5 + H_2O \rightarrow 2HNO_3$$

There is a U.S. patent that discloses a flue gas treatment technology using ozone for oxidizing $NO_x$ into higher oxides (i.e., U.S. Pat. No. 5,316,373, the teachings of which are expressly incorporated herein by reference). In this technology, a wet scrubber is used to scrub higher nitrogen oxides from a gas after an ozone reaction step. Hence, a large amount of low-concentration nitric acid solution is generated, which is the disadvantage of this technology.

In the present invention, the NOx, after being oxidized into the higher nitrogen oxides, can be removed using the SPC materials in similar manner as for SOx removal. The higher nitric oxides are adsorbed on the SPC material together with moisture from the flue gas. The adsorbed nitric oxides and water molecules are converted into nitric acids on the sorbent material and are expelled onto the external surfaces of the SPC material. Therefore, in this process, both NOx and SOx are converted into the corresponding nitric and sulfuric acids, and the mixed nitric acid and sulfuric acid solution is collected as a product.

The following Examples demonstrate some, but not all, of the preferred embodiments of the present invention and are not intended to be limiting.

The teachings contained in the present application are sufficient to enable one of skill in this art to practice all of the embodiments of the present invention without undue experimentation. For example, although the SPC materials described herein are usually designed to remove as many pollutants as possible from the flue gas, there may be certain situations where only one or two of the pollutants are to be selectively removed from a gas stream. One of ordinary skill in the art would understand that the SPC materials of the present invention could be easily tailored so that they selectively remove the targeted pollutant(s) from the gas stream. For example, by carefully selecting the sorbent material and the chemical(s) that are used to treat the sorbent material, it is possible to selectively target the pollutant(s) that is (are) to be removed from the gas stream. One example is to chemically treat a carbon to promote its Hg removal capability and reduce its $SO_2$ removal capability. Such treated CPC material can be used for flue gas Hg removal while generating a minimum amount of acid solution during use.

EXAMPLES

Example 1

Carbon-PTFE Composite Tape

PTFE emulsion: an aqueous dispersion of polytetrafluoroethylene (PTFE) resin. For example, PTFE Dispersion 35 was supplied by Dupont Fluoroproducts. The PTFE particle size is from 0.05 to 0.5 μm; solid content of the PTFE emulsion is 35 wt %.

Activated carbon: fine powered activated carbon. For example, Nuchar RGC carbon powder, which is supplied by MeadWestvaco Corporation. The average carbon particle size is 40 μm. The total pore volume and total surface area are 1.1 cc/g and 1,600 $m^2/g$, respectively.

Activated carbon powder (from MeadWestvaco) was wetted with deionized water then mixed with PTFE emulsion (from Dupont) in a high-speed stirrer tank. The weight ratio of Carbon/PTFE is 70/30. Under intense stirring, the mixture was coagulated. Then, the coagulated mixture was separated from water and dried at 100° C. A lubricant (e.g., 50/50 water/isopropyl alcohol or mineral spirit or kerosene) is used to lubricate the dried mixture and to form a paste. 1.0-1.4 cc lubricant was used per gram of the dried mixture. The paste was then ram-extruded to form a rod. The lubricant (here a water/isopropyl alcohol mixture) was then removed from the extrudate by drying at 120° C. for 4 hours. For other lubricants, the time and temperature for the drying step will vary (i.e., depending on the boiling point of the lubricant), as one of skill in this art would understand. The dried extrudate was calendered through heated rolls to form a 0.5 mm thick carbon-polymer composite (CPC) tape of about 10 cm in width which was then cut down to a desired width (e.g., 4 cm). The tape was then stretched at a 2 to 1 ratio at 240~310° C. at longitudinal direction so that the final length of the tape was about twice the original length while the thickness and width of the tape are basically unchanged.

Example 2

Elemental Sulfur Treated Carbon-PTFE Composite Tape

An activated carbon powder (Nuchar RGC carbon powder from MeadWestvaco) and elemental sulfur powder (from Aldrich, powder particle size <100 mesh, refined) were mixed at a weight ratio (Carbon/Sulfur) of 98/2 in a high-speed stirrer tank at dry condition. The mixture was then heated to 180° C. for 4 hours. After cooling, the carbon-sulfur powder mixture was used as the sorbent material in a CPC tape, which was produced as described in Example 1 (i.e., the carbon-sulfur powder mixture was substituted for the activated carbon powder in Example 1).

Example 3

Iodide Ion Containing Chemical Treated Carbon-PTFE Composite Tape

An activated carbon powder (Nuchar RGC carbon powder from MeadWestvaco) was wetted with deionized water (about 50% by weight carbon and about 50% by weight water), and then put into a water solution that contains an iodide compound (IC), such as potassium iodide and/or sodium iodide to form a slurry mixture. The slurry mixture contained 10-50 wt % of solid and 90-50 wt % water. The IC content impregnated in the activated carbon was 0.2 wt %. The carbon/IC slurry mixture was mixed with PTFE emulsion (PTFE Dispersion 35 from Dupont) at a weight ratio (carbon/PTFE) of 70/30 in a high-speed stirrer tank. Then the mixture is made into CPC tape as described in Example 1.

The iodide compound can be water-soluble metal iodide salts, organic iodide compounds, and iodide coordination complexes, etc. Also a water-insoluble iodide compound can be impregnated using a reaction between two water-soluble compounds. As an example, the following reaction can be used to impregnate carbon with water-insoluble iodide compound, $PbI_2$:

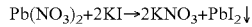

$$Pb(NO_3)_2 + 2KI \rightarrow 2KNO_3 + PbI_2\downarrow$$

To impregnate $PbI_2$ into activated carbon, $Pb(NO_3)_2$ was first impregnated into the carbon as described above, i.e., the carbon was wetted with deionized water, and then mixed with $Pb(NO_3)_2$ solution to form a slurry mixture. The mixture was then dried at 100° C. Afterwards, $Pb(NO_3)_2$ impregnated carbon was wetted with deionized water, and then mixed with the stoichiometric amount of KI solution to form a slurry. $Pb(NO_3)_2$ and KI will react within the activated carbon to form $PbI_2$ which is insoluble and trapped within the activated carbon. The final $PbI_2$ impregnated carbon is then dried at 100° C.

Example 4

Dual-Chemical Treated Carbon-PTFE Composite Tape

An activated carbon powder (Nuchar RGC carbon powder from MeadWestvaco) was mixed with elemental sulfur powder (from Aldrich, powder particle size <100 mesh, refined) at a weight ratio (carbon/sulfur) of 98/2 (note that it is also possible that this ratio could be from 99.95/0.05 to 95/5) in a high-speed stirrer tank at dry condition. The carbon-sulfur mixture was then heated at 180° C. for 4 hours. The treated powder mixture was wetted with deionized water and mixed with an iodide compound solution at a weight ratio (carbon/iodide compound) of 99.8/0.2 (note that it is also possible that this ratio could be from 99.995/0.005 to 97/3) to form a slurry mixture (about 10-50% by weight solids and 90-50% by weight water). The slurry mixture contains carbon/sulfur/iodide compound in the proportion of (98 parts by weight)/(2 parts by weight)/(0.196 parts by weight). The slurry mixture was then mixed with PTFE emulsion (PTFE dispersion 35 from Dupont) at a weight ratio (carbon/PTFE) of 70/30 in a high-speed stirrer tank. Then the mixed materials were made into CPC tape as described in Example 1.

Example 5

Testing of Composite Tape for Flue Gas Pollutant Removal

Figure 12:
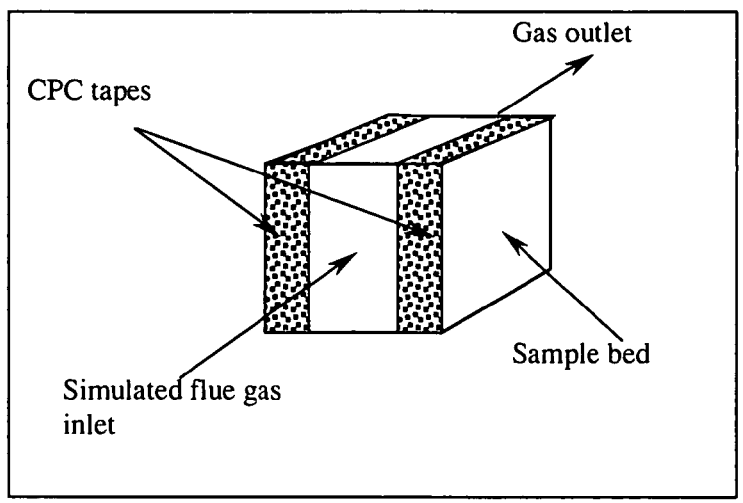
FIG. 12 is a schematic illustration of a sample cell used in the Examples of the present application.

The flue gas pollutant ($SO_2$ and Hg) removal performance of the CPC materials was tested using a bench scale flue gas purification system. During the test, two CPC tapes were mounted in the sample cell in parallel, leaving a gap of 8.0 mm between the two tapes, as shown in FIG. 12. One of the faces of each of the CPC tapes was attached to a wall of the sample bed so that only one of the faces of each piece of CPC tape was exposed to the flue gas. In practice, the CPC sheet material would usually not be attached to the frame of a module such that one of the faces of the CPC sheet material was obstructed and not exposed to the flue gas. Instead, the edges of the CPC sheet material would be attached to the frame of the module to minimize the surface area of the CPC sheet material that is not exposed to the flue gas.

With this sample cell arrangement, the pressure drop over the sample cell is virtually zero. The sample cell was disposed inside an oven to maintain a constant temperature during the test. Simulated flue gas containing preset $SO_2$, Hg concentration, relative humidity, flow rate and temperature was fed into the sample cell. After leaving the sample cell, the concentration of $SO_2$ and Hg still present in the flue gas was constantly monitored by $SO_2$ and Hg analyzers. A typical simulated flue gas contains 900 (or 2,200) ppmv $SO_2$, 5.23 mg/m³ Hg with the balance being air, with a 67° C. temperature and 65% RH. When $CO_2$ and NO were added into the simulated flue gas, $CO_2$ concentration was 6% by volume and NO was 500 ppmv. The simulated flue gas pollutant concentrations closely represented actual flue gas conditions, except for the Hg concentration, which is much higher than would be present in actual flue gas.

The removal efficiency of a flue gas pollutant is defined as follows:

$$\text{Efficiency (\%)} = [1-(\text{Concentration of effluent}/\text{Concentration of influent})] \times 100$$

Example 6

Testing of $SO_2$ Removal Performance Using CPC Tape with Untreated Carbon

Figure 13:
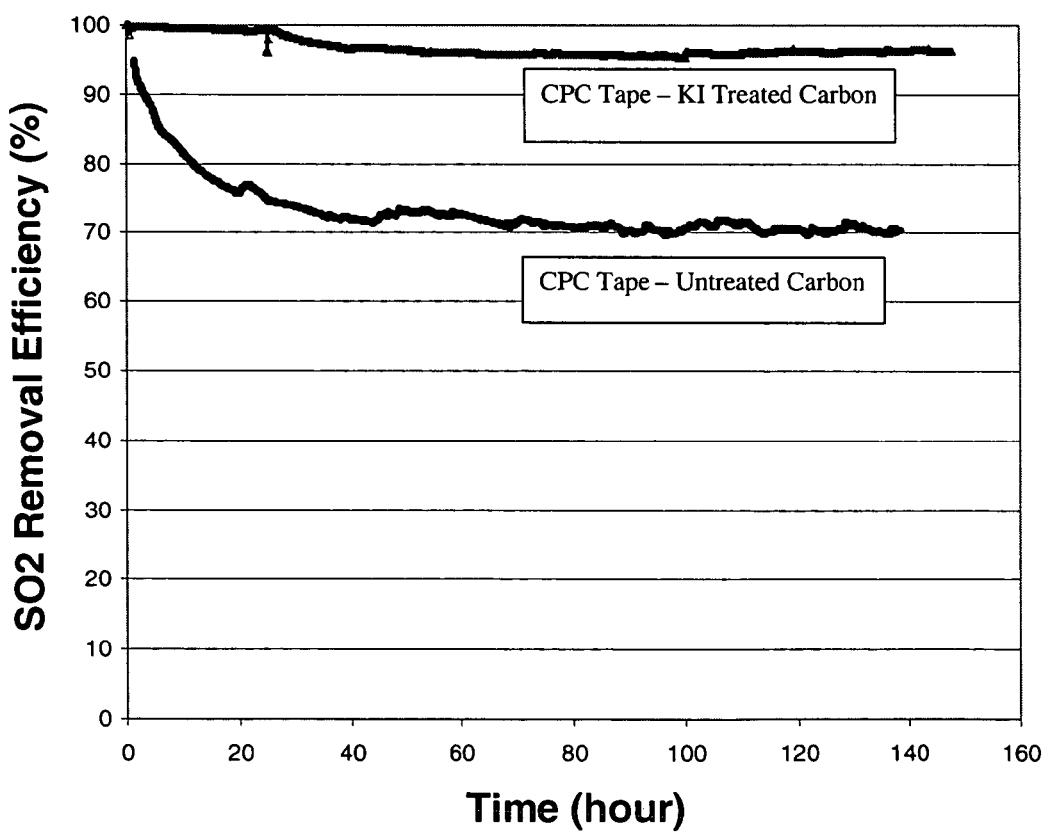
FIG. 13 is a plot of $SO_2$ removal efficiency (%) versus time (hours) for the sample cell tested in Examples 6 and 7.

CPC tape made according to Example 1 was mounted into the sample cell as described in Example 5. Two pieces of tape were mounted on each side of the sample cell, and each piece measured 4 cm by 7 cm and 0.5 mm in thickness. The weight of each piece is 0.45 gram. The simulated flue gas in conditions of 900 ppm $SO_2$ with 84% RH, 67° C. temperature, and 150 sccm flow rate was fed into the sample cell. The $SO_2$ concentration in the effluent flue gas from the sample cell was measured by an $SO_2$ analyzer, and the results were plotted in FIG. 13. As can be seen from the Figure, the $SO_2$ removal efficiency decreased slowly in the beginning of the test and stabilized after 60-80 hours. The $SO_2$ removal efficiency stabilized around 70% in this run. During the testing, no CPC sample regeneration was ever performed. Sulfuric acid solution converted from $SO_2$ was expelled to the sample outer surfaces from the CPC matrix and dripped down and collected in a collector automatically. A picture of the outer surface of the CPC sample during the test is shown in FIG. 10, which shows numerous acid solution droplets and the solution dripping trajectories. The collected acid solution had an $H_2SO_4$ concentration of 28% by weight.

Example 7

Testing of $SO_2$ Removal Performance Using CPC Tape with Iodide Compound Treated Carbon CPC tape made according to Example 3, where potassium iodide (potassium iodide, 99%, from Aldrich) was used as the iodide compound for carbon treatment, was mounted into the sample cell as described in Example 5. Two pieces of tape were mounted on each side of the sample cell, and each piece measured 4 cm by 7 cm and 0.5 mm in thickness. The weight of each piece is 0.45 gram. The simulated flue gas in conditions of 900 ppm $SO_2$ with 65% RH, 67° C. temperature, and 150 sccm flow rate was fed into the sample cell. The $SO_2$ concentration in the effluent flue gas from the sample cell was measured by an $SO_2$ analyzer, and the results were plotted in FIG. 13. As can be seen from the figure, the $SO_2$ removal efficiency decreased slowly in the beginning of the test and stabilized after 30-40 hours. The $SO_2$ removal efficiency stabilized above 95% in this run. During the testing, no CPC sample regeneration was ever performed. Sulfuric acid solution converted from $SO_2$ was expelled to the sample outer surfaces from the CPC matrix and dripped down and collected in a collector automatically. The collected acid solution had an $H_2SO_4$ concentration of 38% by weight.

Example 8

Figure 14:
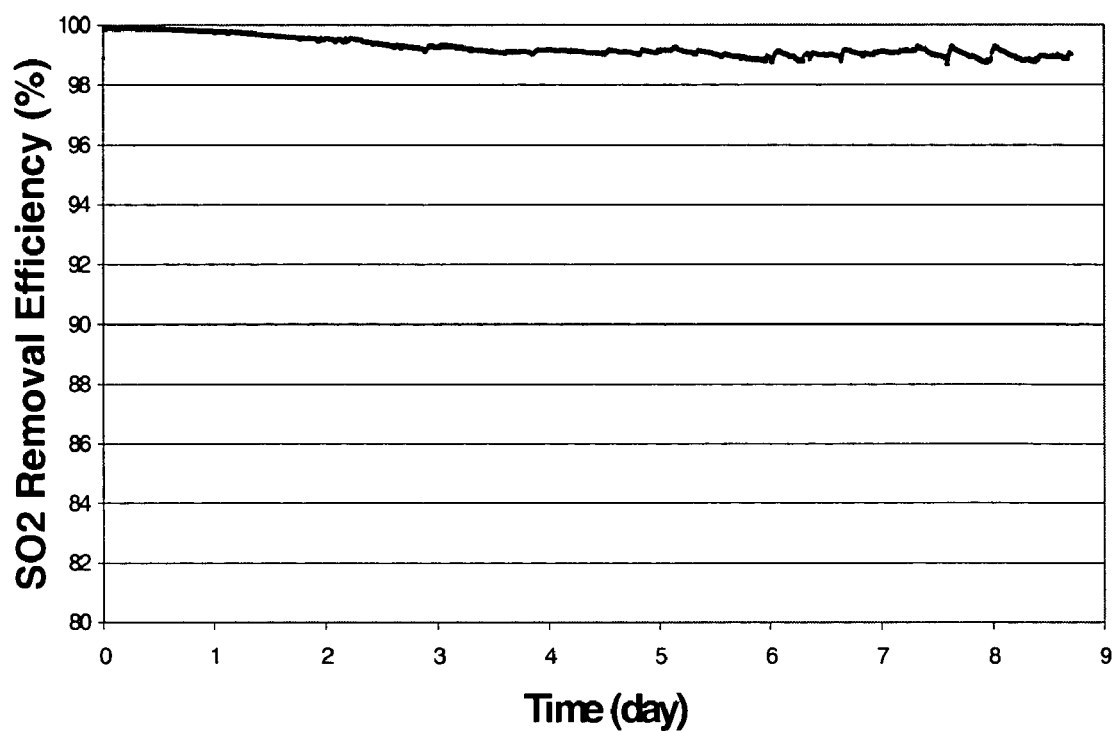
FIG. 14 is a plot of $SO_2$ removal efficiency (%) versus time (days) for the sample cell tested in Example 8.
Figure 15:
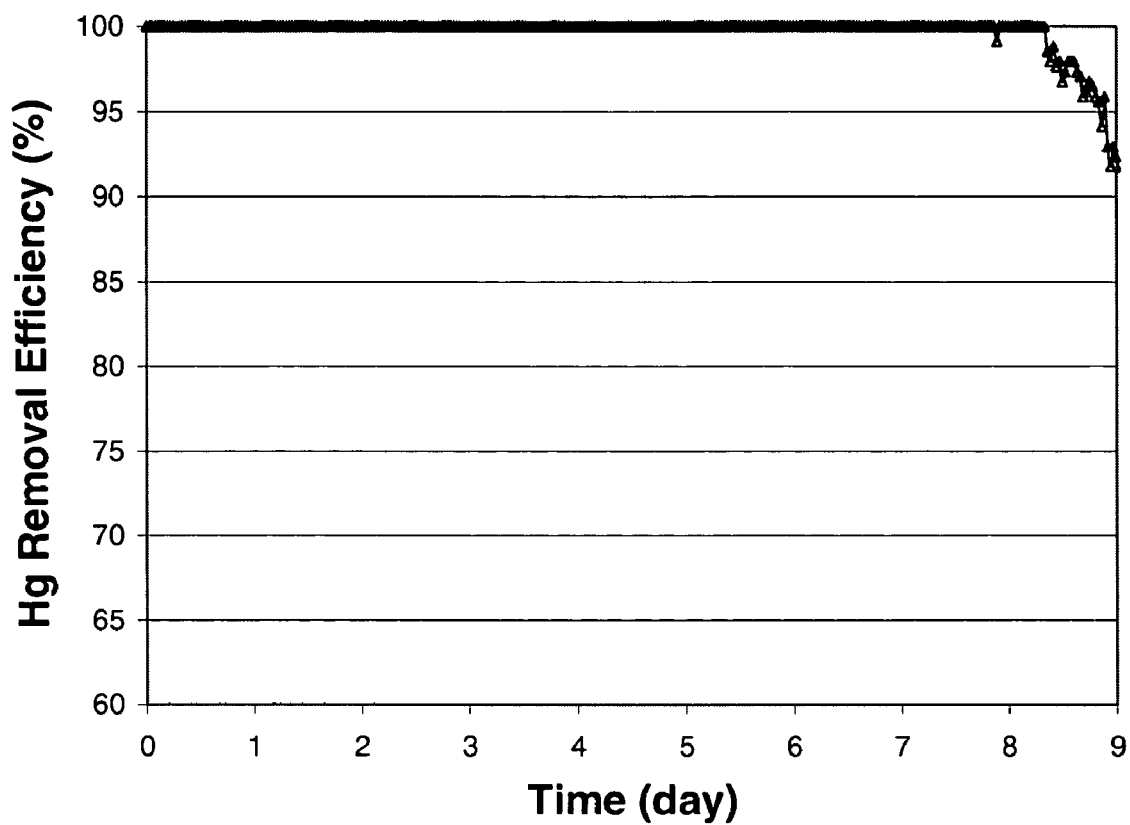
FIG. 15 is a plot of Hg removal efficiency (%) versus time (days) for the sample cell tested in Example 8.

Testing of Simultaneous Removal of $SO_2$ and Hg Vapor Using Dual-Chemical Treated Carbon-PTFE Composite Tape CPC tape made according to Example 4, that is, carbon was treated with potassium iodide (from Aldrich, 99%) and elemental sulfur and then made into CPC material, was mounted into the sample cell as described in Example 5. Two pieces of tape were mounted on each side of the sample cell, and each piece measured 4 cm by 7 cm and 0.5 mm in thickness. The weight of each piece is 0.45 gram. The simulated flue gas in conditions of 900 ppm $SO_2$ and 5.2 mg/m$^3$ Hg vapor with 65% RH, 67° C. temperature, and 150 sccm flow rate was fed into the sample cell. All Hg vapor used in the examples of this patent application was elemental Hg vapor. The $SO_2$ and Hg concentrations in the effluent flue gas from the sample cell were measured by $SO_2$ and Hg analyzers, and the results were plotted in FIGS. 14 and 15. As can be seen from the figures, both $SO_2$ and Hg removal efficiencies were very high, over 98% for $SO_2$ and almost 100% for Hg, during the first 8 days of the test. It is anticipated that, after 8 days, the $SO_2$ removal would be continued in high efficiency while Hg removal efficiency would decline quickly if the test continues. Unlike $SO_2$ removal, wherein the converted $H_2SO_4$ is expelled from the CPC material matrix, Hg is trapped inside the CPC matrix as HgS, and the trapped HgS would eventually saturate the carbon's Hg removal sites. The rapid saturation of the CPC material with HgS is due to the high Hg concentration used for the test. The Hg removal capacity of the CPC material would last several years for high Hg removal performance in actual flue gas conditions, where Hg is present in an extremely low concentration.

Although a much higher Hg vapor concentration than that of actual flue gases was used for the test, the resulting Hg removal efficiency and capacity should be a valid reference for practical applications. Hg removal in this technology is based on a chemical vapor sorption process, which is insensitive to the vapor concentration.

Example 9

Figure 16:
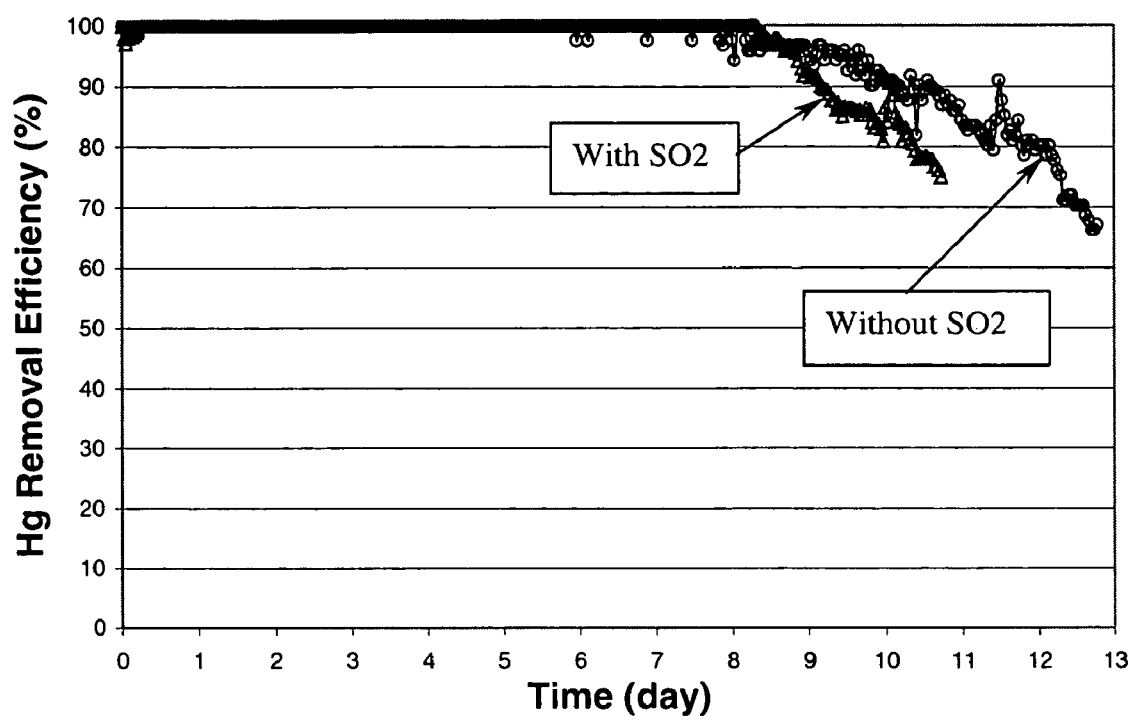
FIG. 16 is a plot of Hg removal efficiency (%) versus time (days) for the sample cell tested in Example 9.

Testing of Hg Removal with and without Presence of $SO_2$ in the Simulated Flue Gas CPC tape made according to Example 4, that is, carbon was treated with potassium iodide (from Aldrich, 99%) and elemental sulfur and then made into CPC material, was mounted into the sample cell as described in Example 5. Two pieces of tape were mounted on each side of the sample cell, and each piece measures 4 cm by 7 cm and 0.5 mm in thickness. The weight of each piece is 0.45 gram. Two separate tests were performed. In the first test, the simulated flue gas in conditions of 5.2 mg/m$^3$ Hg vapor with 65% RH, 67° C. temperature, and 150 sccm flow rate was fed into the sample cell. No $SO_2$ was present in the flue gas. The performance of Hg vapor removal was recorded. In the second test, everything else was exactly the same as the first test, except that the simulated flue gas contains 300 ppm $SO_2$. The performance of Hg vapor removal was recorded. Both test results are shown in FIG. 16. As can be seen from the figure, the CPC material had a similar Hg removal performance whether the simulated flue gas contained $SO_2$ or not.

Example 10

Figure 17:
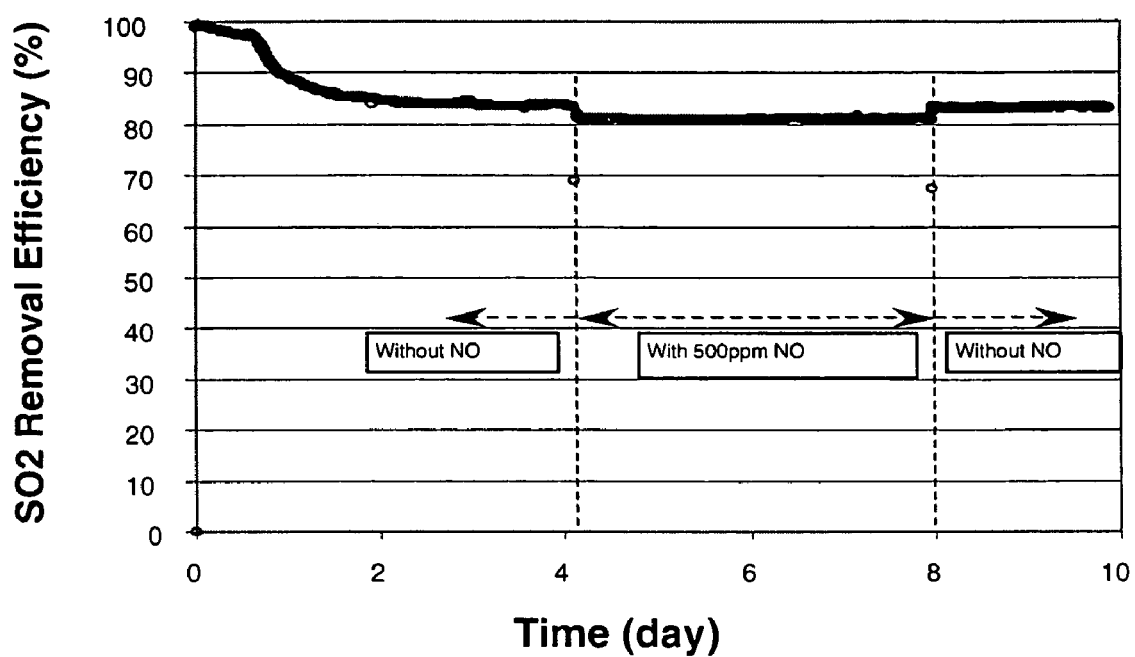
FIG. 17 is a plot of $SO_2$ removal efficiency (%) versus time (days) for the sample cell tested in Example 10.

Testing of $SO_2$ Removal with Presence of NO and $CO_2$ in the Simulated Flue Gas CPC tape made according to Example 3, here carbon was treated with potassium iodide and then made into CPC material, was mounted into the sample cell as described in Example 5. Two pieces of tape were mounted on each side of the sample cell, and each piece measures 4 cm by 7 cm and 0.5 mm in thickness. The weight of each piece is 0.45 gram. First, the simulated flue gas in conditions of 2,200 ppm $SO_2$ with 65% RH, 67° C. temperature, and 150 sccm flow rate was fed into the sample cell. After about 4 days, when the stable $SO_2$ removal efficiency was established, 500 ppm NO was added into the simulated flue gas. The $SO_2$ concentration in the effluent flue gas from the sample cell was measured by an $SO_2$ analyzer, and the results were plotted in FIG. 17. As can be seen from the figure, by adding NO, the $SO_2$ removal efficiency decreased by about 2%. After 4 more days, NO was removed from the simulated flue gas stream, and the $SO_2$ removal efficiency returned to the original level. The same experiment was performed with a 6% by volume $CO_2$ stream, and it was found that no appreciable $SO_2$ removal performance deterioration was observed. These tests showed that other flue gas impurities, such as NO and $CO_2$, do not significantly interfere with the CPC's $SO_2$ removal performance.

Example 11

Testing of $SO_2$ Removal Under Different Temperatures

Figure 18:
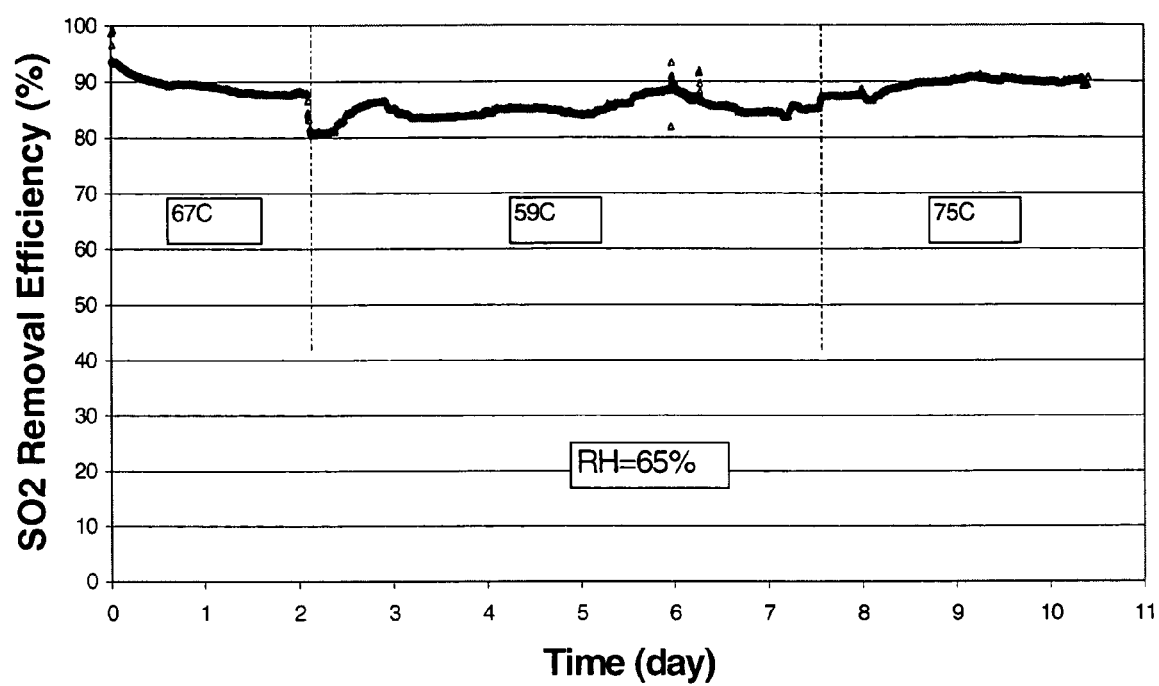
FIG. 18 is a plot of $SO_2$ removal efficiency (%) versus time (days) for the sample cell tested in Example 11.

CPC tape made according to Example 3, here carbon was treated with potassium iodide and then made into CPC material, was mounted into the sample cell as described in Example 5. Two pieces of tape were mounted on each side of the sample cell, and each piece measures 4 cm by 7 cm and 0.5 mm in thickness. The weight of each piece is 0.45 gram. First, the simulated flue gas in conditions of 2,200 ppm $SO_2$ with 65% RH and 150 sccm flow rate was fed into the sample cell at 67° C. temperature. After about 2 days, when the stable $SO_2$ removal efficiency was established, the flue gas temperature was switched to 59° C., and kept at that temperature for about 5 days. Finally, the flue gas temperature was switched to 75° C. The $SO_2$ removal performance at different temperatures was recorded and is shown in FIG. 18. As can be seen from the figure, within a temperature range of 59-75° C., the CPC material has a similar $SO_2$ removal performance. This experiment shows that temperature change in the range of 59-75° C. does not affect the $SO_2$ performance of the CPC material significantly.

Example 12

Testing of Long Term $SO_2$ Removal Performance

Figure 19:
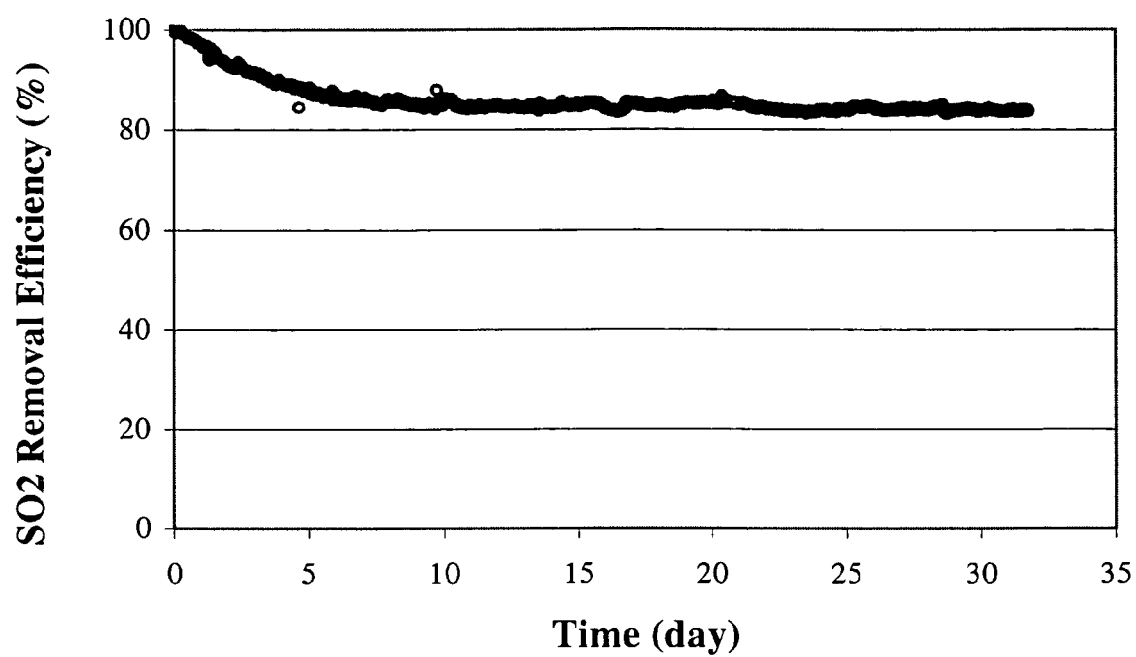
FIG. 19 is a plot of $SO_2$ removal efficiency (%) versus time (days) for the sample cell tested in Example 12.

CPC tape made according to Example 3, here carbon was treated with potassium iodide and then made into CPC material, was mounted into the sample cell as described in Example 5. Two pieces of tape were mounted on each side of the sample cell, and each piece measured 4 cm by 7 cm and 0.5 mm in thickness. The weight of each piece is 0.45 gram. The simulated flue gas in conditions of 2,200 ppm $SO_2$ with 65% RH, 67° C. temperature, and 150 sccm flow rate was fed into the sample cell. The $SO_2$ concentration in the effluent flue gas from the sample cell was measured by an $SO_2$ analyzer, and the results were plotted in FIG. 19. The test lasted about 32 days, and it can be seen from the figure that the CPC material maintained a relatively stable $SO_2$ removal performance throughout the time period. No appreciable $SO_2$ performance deterioration was observed.

Example 13

Testing of $SO_2$ Removal Under Different Relative Humidity Levels

Figure 20:
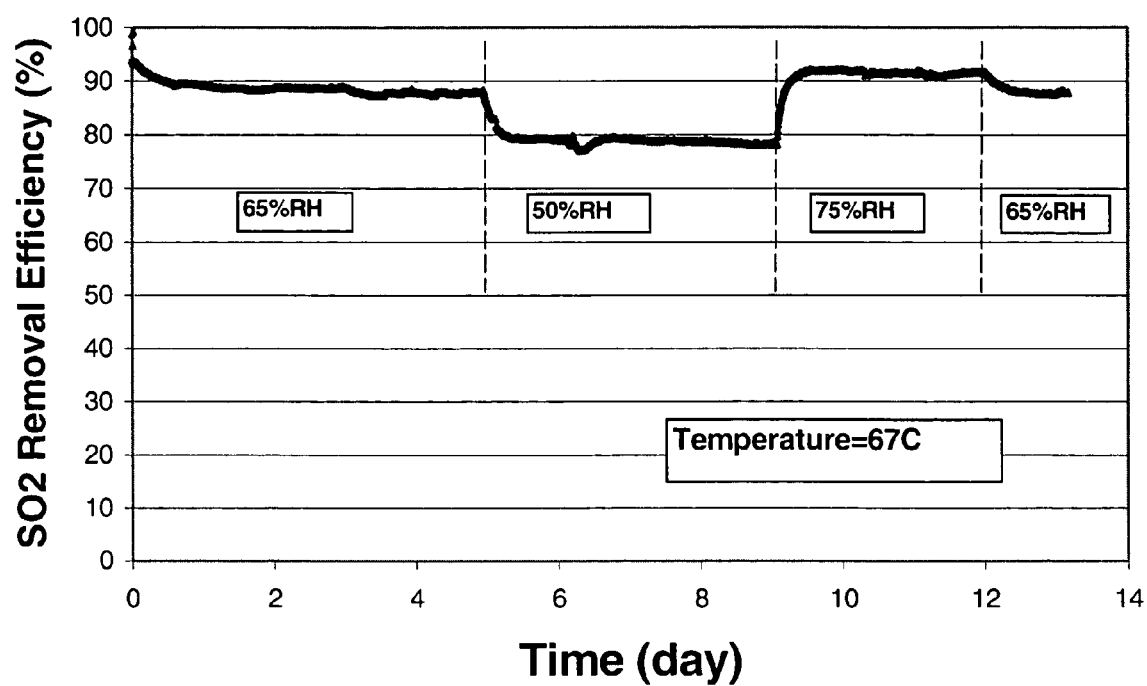
FIG. 20 is a plot of $SO_2$ removal efficiency (%) versus time (days) for the sample cell tested in Example 13.

CPC tape made according to Example 3, here carbon was treated with potassium iodide and then made into CPC material, was mounted into the sample cell as described in Example 5. Two pieces of tape were mounted on each side of the sample cell, and each piece measured 4 cm by 7 cm and 0.5 mm in thickness. The weight of each piece is 0.45 gram. First, the simulated flue gas in conditions of 2,200 ppm $SO_2$ at 67° C. temperature and 150 sccm flow rate was fed into the sample cell at 65% RH level. After about 5 days, when the stable $SO_2$ removal efficiency was established, the flue gas RH was switched to a 50% level, and kept at that level for about 4 days. Then, the flue gas RH was increased to a 75% level, and kept at that level for about 3 days. Finally, the flue gas RH was switched to a 65% level, which was the original level. The $SO_2$ removal performance at these different RH levels was recorded and is shown in FIG. 20. As can be seen from the figure, the CPC material has a higher $SO_2$ removal efficiency at higher RH levels, although the $SO_2$ removal efficiency was always greater than 75%. It is well known that, for an activated carbon based low temperature $SO_2$ removal process, high RH levels are preferred. Ideally, RH levels between 40-95% are preferred. However, near 100% RH levels should be avoided to prevent water condensation on flue gas ducts and other system surfaces.

Example 14

Effect of Carbon Chemical Treatment on Mercury Removal Performance

Four CPC tape samples were made according to Examples 1, 3 and 4.

Sample-1: This sample was prepared according to Example 1, that is, virgin activated carbon (without any chemical treatment) and PTFE emulsion were made into CPC tapes.

Sample-2: This sample was prepared according to Example 3, that is, activated carbon was first impregnated with 0.2 wt % potassium iodide (KI), then the impregnated carbon and PTFE emulsion were made into CPC tapes.

Sample-3: This sample was prepared according to Example 3, that is, activated carbon was first impregnated with 0.2 wt % potassium hexaiodoplatinate ($K_2PtI_6$ from Aldrich) (i.e., instead of potassium iodide), then the impregnated carbon and PTFE emulsion were made into CPC tapes.

Sample-4: This sample was prepared according to Example 4, that is, activated carbon was first treated with 2 wt % elemental sulfur, and then impregnated with 0.2 wt % potassium iodide (KI). The dual-chemical treated carbon and PTFE emulsion were made into CPC tapes.

Figure 21:
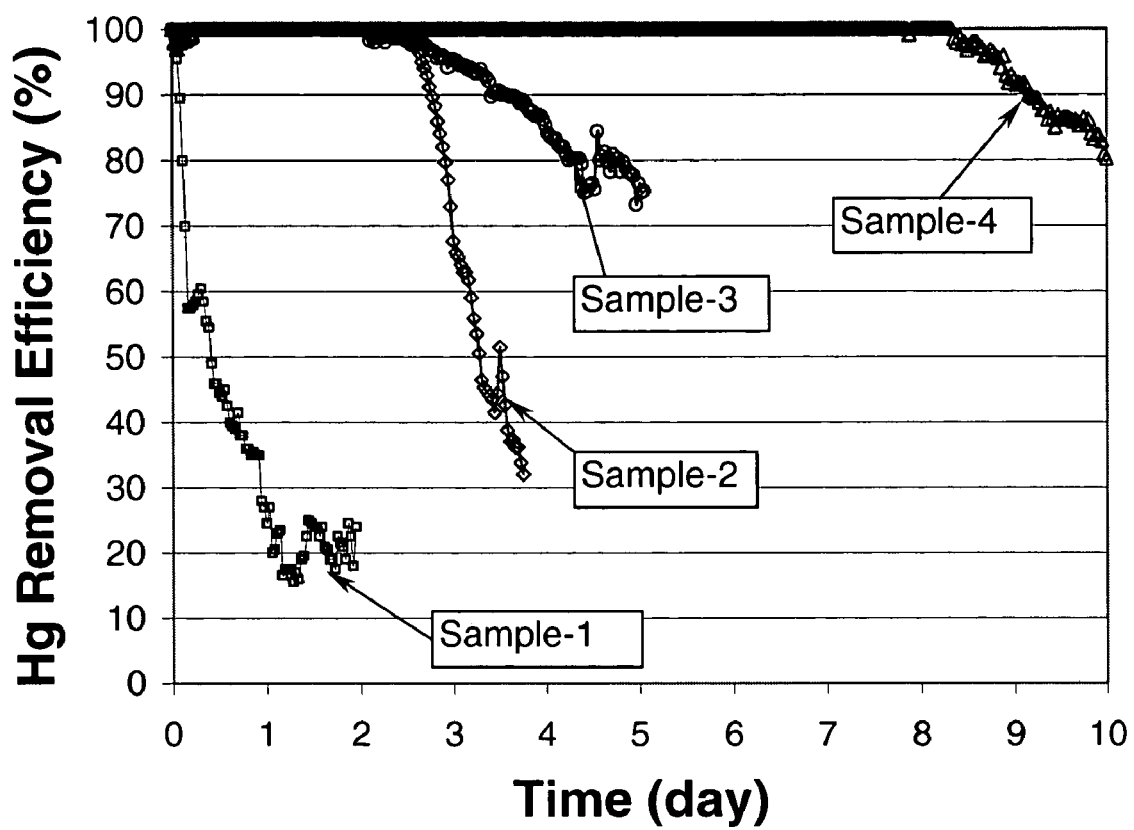
FIG. 21 is a plot of Hg removal efficiency (%) versus time (days) for the sample cell tested in Example 14.

After the tape samples were made, each sample was tested for its mercury removal performance with the same testing procedures. Two pieces of tape were mounted on each side of the sample cell as described in Example 5, and each piece measured 4 cm by 7 cm and 0.5 mm in thickness. The weight of each piece is 0.45 gram. The simulated flue gas in conditions of 5.2 mg/m³ Hg vapor, 2200 ppm $SO_2$ with 50% RH, 67° C. temperature, and 150 sccm flow rate was fed into the sample cell. The performance of Hg vapor removal was recorded. The testing results are shown in FIG. 21. As can be seen from the figure, the chemical treatment of the carbon material has a profound effect on the Hg removal performance of the CPC material. Without chemical treatment, the CPC material has a very small Hg adsorption capacity, less than 0.012 wt % capacity at 90% removal efficiency. With chemical treatment, the sample's Hg removal performance enhanced significantly, for example, the dual-chemical treated sample (Sample-4) achieved over 1.32 wt % Hg removal capacity at 90% removal efficiency.

The scope of the present invention should not be limited to the specific examples and descriptions provided in the foregoing specification. An artisan of ordinary skill will readily appreciate the numerous minor modifications that may be made to the present invention without departing from its spirit and scope as outlined in the claims appended hereto.

We claim:

1. A process for removing sulfur oxides, nitric oxides, Hg vapor, and fine particulate matters from a body or stream of gas comprising the following steps:
   a. converting said sulfur oxides and nitric oxides into sulfuric acid and nitric acid on a sorbent material which is a part of a sorbent-polymer-composite (SPC) material;
   b. collecting the converted sulfuric acid and nitric acid as droplets on the external surfaces of the SPC material until the droplets coalesce and run down or drip off of the external surfaces of the SPC material;
   c. chemically adsorbing and fixing molecules of said Hg vapor in the SPC material; and
   d. trapping said fine particles on the external surfaces of the SPC material.

2. The process of claim 1, wherein the SPC material is a composite material made of said sorbent material, which is either untreated or treated with at least one chemical substance that is retained in or on the sorbent material, and a polymer material comprising at least one fluoropolymer.

3. The process of claim 1, wherein SPC material is in the form of one or more sheets that are formed by stretching the SPC material at high temperature to produce a microporous structure, further wherein the stretching ratio is from 0.1 to 500%.

4. The process of claim 3, wherein the one or more sheets of SPC material are held within a larger framework which is in contact with the body or stream of gas.

5. The process of claim 3, wherein the one or more sheets of SPC material form at least part of a bag structure through which the body or stream of gas is passed.

6. The process of claim 1, wherein the SPC material is in the form of a body that is at least partially coated or covered with a porous PTFE membrane.

7. The process of claim 1, wherein the sorbent material is an activated carbon that is either untreated or has been treated with at least one chemical substance that is retained in or on the activated carbon.

8. The process of claim 1, wherein the polymer comprises a fluoropolymer selected from the group consisting of polytetrafluoroethylene (PTFE); polyfluoroethylene propylene (PFEP); polyperfluoroacrylate (PPFA); polyvinyl-lidene fluoride (PVDF); a terpolyrner of tetrafluoroethylene, hexafluoropropylene and vinylidene fluoride (THV); polychioro trifluoro ethylene (PCFE), and other copolymers or terpolymers containing at least one fluoromonomer with or without additional non-fluorinated monomers.

9. The process of claim 2, wherein the sorbent material has been treated with at least one chemical substance selected from the group consisting of: alkaline metal iodides, organic iodide compounds, vanadium oxides, metal sulfates, elemental sulfur, sulfuric acid, oxides of iodine, chlorides of potassium, bromides of potassium, chlorides of sodium, bromides of sodium, chlorides of ammonium, bromides of ammonium, iodides of ammonium, zinc acetate and iodide coordination complexes.

10. A method for removing Hg vapor from a body or stream of gas comprising the steps of:

(a) contacting the body or stream of gas with a sorbent-polymer-composite material comprising: (i) a sorbent material in the form of porous particles; and (ii) a polymer material comprising at least one fluoropolymer or a copolymer or terpolymer containing at least one fluoromonomer, wherein the sorbent material is held within a matrix of the polymer material such that the particles of sorbent material are in contact with the polymer material; and (b) chemically adsorbing the Hg vapor on the porous particles, wherein the sorbent material is either untreated or has been treated with at least one chemical substance that is retained in or on the sorbent material.

11. The method of claim 10, wherein the sorbent material is activated carbon which is either untreated or has been treated with at least one chemical substance that is retained in or on the activated carbon and the polymer material is selected from the group consisting of polytetrafluoroethylene (PTFE); polyfluoroethylene propylene (PFEP); polyperfluoroacrylate (PPFA); polyvinyl-lidene fluoride (PVDF); a terpolymer of tetrafluoroethylene, hexafluoropropylene and vinylidene fluoride (THV); polychloro trifluoro ethylene (PCFE), and other copolymers or terpolymers containing at least one fluoromonomer with or without additional non-fluorinated monomers.

12. The method of claim 10, wherein the sorbent material has been chemically treated with at least one chemical substance selected from the group consisting of: elemental sulfur, sulfuric acid, metal sulfates, oxides of iodine, chlorides of potassium, bromides of potassium, iodides of potassium, chlorides of sodium, bromides of sodium, iodides of sodium, chlorides of ammonium, bromides of ammonium, iodides of ammonium and zinc acetate.

13. The process of claim 1, wherein the body or stream of gas is a flue gas which is brought to a temperature of 30-100° C. and a relative humidity of 10-95%, before contacting the SPC material, by spraying water into said body or stream of gas.

* * * * *